United States Patent
Forman et al.

(10) Patent No.: US 12,522,667 B2
(45) Date of Patent: *Jan. 13, 2026

(54) CHIMERIC ANTIGEN RECEPTORS (CARs) HAVING MUTATIONS IN THE FC SPACER REGION AND METHODS FOR THEIR USE

(71) Applicant: City of Hope, Duarte, CA (US)

(72) Inventors: Stephen J. Forman, Duarte, CA (US); Christine E. Brown, Duarte, CA (US); Armen Mardiros, Glendale, CA (US)

(73) Assignee: City of Hope, Duarte, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 17/510,099

(22) Filed: Oct. 25, 2021

(65) Prior Publication Data

US 2022/0372164 A1 Nov. 24, 2022

Related U.S. Application Data

(63) Continuation of application No. 16/221,257, filed on Dec. 14, 2018, now abandoned, which is a continuation of application No. 15/111,384, filed as application No. PCT/US2014/028961 on Mar. 14, 2014, now abandoned.

(60) Provisional application No. 61/926,881, filed on Jan. 13, 2014.

(51) Int. Cl.
| | |
|---|---|
| C07K 14/00 | (2006.01) |
| A61K 39/395 | (2006.01) |
| A61K 40/11 | (2025.01) |
| A61K 40/31 | (2025.01) |
| A61K 40/42 | (2025.01) |
| A61K 45/06 | (2006.01) |
| C07K 14/705 | (2006.01) |
| C07K 14/71 | (2006.01) |
| C07K 14/725 | (2006.01) |
| C07K 16/00 | (2006.01) |
| C07K 16/28 | (2006.01) |
| C07K 16/30 | (2006.01) |

(52) U.S. Cl.
CPC ........ *C07K 16/30* (2013.01); *A61K 39/39558* (2013.01); *A61K 40/11* (2025.01); *A61K 40/31* (2025.01); *A61K 40/4211* (2025.01); *A61K 45/06* (2013.01); *C07K 14/7051* (2013.01); *C07K 14/70517* (2013.01); *C07K 14/70521* (2013.01); *C07K 14/71* (2013.01); *C07K 16/00* (2013.01); *C07K 16/2803* (2013.01); *C07K 16/2866* (2013.01); *A61K 2239/17* (2023.05); *A61K 2239/31* (2023.05); *A61K 2239/38* (2023.05); *C07K 2317/524* (2013.01); *C07K 2317/526* (2013.01); *C07K 2317/53* (2013.01); *C07K 2317/56* (2013.01); *C07K 2317/622* (2013.01); *C07K 2317/92* (2013.01); *C07K 2319/00* (2013.01); *C07K 2319/02* (2013.01); *C07K 2319/03* (2013.01); *C07K 2319/30* (2013.01); *C07K 2319/33* (2013.01)

(58) Field of Classification Search
CPC ............... C07K 16/30; C07K 14/7051; C07K 14/70517; C07K 14/70521; C07K 14/71; C07K 16/00; A61K 39/39558; A61K 45/06

See application file for complete search history.

(56) References Cited

U.S. PATENT DOCUMENTS

| | | | |
|---|---|---|---|
| 7,070,995 | B2 | 7/2006 | Jensen |
| 9,657,105 | B2 * | 5/2017 | Forman ............... A61K 35/17 |
| 9,914,909 | B2 | 3/2018 | Brown et al. |
| 10,660,916 | B2 | 5/2020 | Forman et al. |
| 10,676,717 | B2 | 6/2020 | Brown et al. |
| 11,918,606 | B2 | 3/2024 | Forman et al. |
| 2002/0102264 | A1 | 8/2002 | Cheung |
| 2009/0252742 | A1 | 10/2009 | Bergstein |
| 2012/0148552 | A1 | 6/2012 | Jensen |
| 2012/0301447 | A1 | 11/2012 | Jensen |
| 2013/0004514 | A1 | 1/2013 | Zahn |
| 2013/0287798 | A1 | 10/2013 | Cheung |
| 2013/0295116 | A1 | 11/2013 | Zahn et al. |
| 2014/0271582 | A1 | 9/2014 | Forman et al. |
| 2014/0271635 | A1 | 9/2014 | Brogdon et al. |
| 2014/0322212 | A1 | 10/2014 | Brogdon |
| 2015/0024482 | A1 | 1/2015 | Frigault et al. |
| 2016/0333108 | A1 | 11/2016 | Forman et al. |
| 2017/0260277 | A1 | 9/2017 | Forman et al. |
| 2020/0040096 | A1 | 2/2020 | Forman et al. |
| 2020/0254023 | A1 | 8/2020 | Forman et al. |

FOREIGN PATENT DOCUMENTS

| | | |
|---|---|---|
| CN | 101952454 | 1/2011 |
| CN | 103492406 | 1/2014 |
| CN | 105392887 | 3/2016 |

(Continued)

OTHER PUBLICATIONS

Hudecek et al (Clin Cancer Res 19:3153-64, Jun. 2013 (Year: 2013).*

(Continued)

*Primary Examiner* — Lei Yao

(74) *Attorney, Agent, or Firm* — Foley & Lardner LLP

(57) ABSTRACT

Chimeric antigen receptors that include an antigen recognition domain; a spacer domain derived from a modified immunoglobulin Fc region having one or more mutations in its CH2 region resulting in impaired binding to an FcR; and an intracellular signaling domain.

6 Claims, 8 Drawing Sheets

Specification includes a Sequence Listing.

(56) References Cited

FOREIGN PATENT DOCUMENTS

| EA | 009873 | 4/2008 |
|---|---|---|
| JP | 2011-514150 | 5/2011 |
| JP | 2012-501180 | 1/2012 |
| JP | 2016-514457 | 5/2016 |
| WO | WO 2005/076843 | 8/2005 |
| WO | WO 2009/100309 | 8/2009 |
| WO | WO 2010/025177 | 3/2010 |
| WO | WO 2010/085682 | 7/2010 |
| WO | WO 2011/056894 | 5/2011 |
| WO | WO 2012/031744 | 3/2012 |
| WO | WO 2012/168199 | 12/2012 |
| WO | WO 2012/079000 | 8/2013 |
| WO | WO 2013/123061 | 8/2013 |
| WO | WO 2014/144622 | 9/2014 |

OTHER PUBLICATIONS

Aigner, M., et al., "T Lymphocytes Can Be Effectively Recruited for Ex Vivo and In Vivo Lysis of AML Blasts By a Novel CD33/CD3-Bispecific BITE Antibody Construct," Leukemia 27:1107-1115 (2013).
Appay, V., et al., "CD8+ T Cell Efficacy in Vaccination and Disease," Nat. Med. 14(6):623-628 (2008).
Armen Mardiros v. City of Hope, "Summons in a Civil Action, " Case 2:19-cv-02196-CAS-MAA, Mar. 25, 2019, 83 pages.
Bhatia, R., et al., "Abnormal Function of the Bone Marrow Microenvironment in Chronic Myelogenous Leukemia:Role of Malignant Stromal Macrophages," Blood 85:3636-3645 (1995).
Brentjens, R. J., et al., "Eradication of Systemic B-Cell Tumors by Genetically Targeted Human T Lymphocytes Co-Stimulated by CD80 and Interleukin-15," Nat. Med. 9(3):279-286 (2003).
Brentjens, R. J., et al., "Safety and Persistence of Adoptively Transferred Autologous CD19-Targeted T Cells in Patients with Relapsed or Chemotherapy Refractory B-Cell Leukemias," Blood 118:4817-4828 (2011).
Brown, C. E., et al., "Recognition and Killing of Brain Tumor Stem-Like Initiating Cells by CD8+ Cytolytic T Cells," Cancer Res. 69:8886-8893 (2009).
Brown, E. J., et al., "Integrin-Associated Protein (CD47) and Its Ligands," Trends Cell Biol. 11(3):130-135 (2001).
Chinese First Office Action in Chinese Application No. 201480024929.6, dated Feb. 1, 2018, 16 pages (with English Translation).
Cooper, L. J. N., et al., "T-Cell Clones can be Rendered Specific for CD 19: Toward the Selective Augmentation of the Graft-Versus-B-Lineage Leukemia Effect," Blood 101:1637-1644 (2003).
Dohner, H., et al., "Diagnosis and Management of Acute Myeloid Leukemia in Adults: Recommendations from an International Expert Panel, on Behalf of the European LeukemiaNet," Blood 115:453-474 (2010).
Du, X., et al., "New Immunotoxins Targeting CD123, a Stem Cell Antigen on Acute Myeloid Leukemia Cells," J. Immunother. 30:607-613 (2007).
Dutour, A., et al., "In Vitro and In Vivo Antitumor Effect of Anti-CD33 Chimeric Receptor-Expressing EBV-CTL Against CD33+ Acute Myeloid Leukemia," Adv. Hematol. 2012:683065 (2012). EFS.
Eaves, C. J., et al., "Acute Myeloid Leukemia and the Wnt Pathway," New Eng. J. Med. 362(24):2326-2327 (2010).
European Application No. 14765454.5, Extended European Search Report, dated Dec. 6, 2016, 11 pages.
European Application No. 14877876.4, Extended European Search Report, dated Jul. 28, 2017, 10 pages.
European Office Action in European Application No. 14877876.4, dated Jul. 13, 2018, 7 pages.
European Search Report in European Application No. 19189084.7, dated Feb. 14, 2020, 6 pages.
European Search Report in European Application No. 19204610.0, dated Feb. 24, 2020, 13 pages.
Flamar et al., "Non-covalent Assembly of Anti-Dendritic Cell Antibodies and Antigens for Evoking Immune Responses in vitro and in vivo," J Immunol., Sep. 1, 2012, 189(5):2645-2655.
Gattinoni, L., et al., "A Human Memory T-Cell Subset with Stem Cell-Like Properties," Nat. Med. 17(10):1290-1297 (2011).
Golden-Mason, L., et al., "Negative Immune Regulator Tim-3 Is Overexpressed on T Cells in Hepatitis C Virus Infection and Its Blockade Rescues Dysfunctional CD4+ and CD8+ T Cells," J. Virol. 83(18):9122-9130 (2009).
Hernandez-Caselles, T., et al., "A Study of CD33 (SIGLEC-3) Antigen Expression and Function on Activated Human land NK Cells: Two Isoforms of CD33 are Generated by Alternative Splicing," J. Leukocyte Biol. 79:46-58 (2006).
Hombach et al., "Adoptive immunotherapy with genetically engineered T cells: modification of the IgG1 Fc 'spacer' domain in the extracellular moiety of chimeric antigen receptors avoids 'off-target' activation and unintended initiation of an innate immune response," Gene therapy, Oct. 2010, 17(10):1206-1213.
Hudecek, M., et al., "The B-Cell Tumor-Associated Antigen RORI can be Targeted with T Cells Modified to Express a ROR1-Specific Chimeric Antigen Receptor," Blood 116:4532-4541(2010).
Hudecek et al., "The Non-Signaling Extracellular Spacer Domain of CD19-Specific Chimeric Antigen Receptors is Decisive for in vivo Anti-Tumor Activity", Meeting Abstract No. 951, Blood 2012, 120:951 (2012), 3 pages.
Hudecek et al., "Receptor Affinity and Extracellular Domain Modifications Affect Tumor Recognition by ROR1-Specific Chimeric Receptor T Cells," Clinical Cancer Research, 19(12):3153-3164, Apr. 19, 2013.
International Application No. PCT/US14/29109, Notification of Transmittal of the International Search Report and the Written Opinion of the International Searching Authority, mailed Apr. 17, 2015, 16 pages.
International Application No. PCT/US2014/028961, Notification of Transmittal of the International Search Report and the Written Opinion of the International Searching Authority, mailed Jul. 28, 2014, 9 pages.
Japanese Notice of Reasons for Rejection in Japanese Application No. 2016-502984, dated Feb. 13, 2018 14 pages (with English Translation).
Jena, B., et al., "Redirecting T-Cell Specificity by Introducing a Tumor-Specific Chimeric Antigen Receptor," Blood 116:1035-1044(2010).
Jensen, "Abstract IA22: Advanced T cell engineering for cancer immunotherapy," Cancer Research (2013) vol. 73, No. 1 Supplement, p. IA22 (Abstract IA22) (Published Jan. 2013) [online], Internet <URL: http://cancerres.aacrjournals.org/content/73/1_Supplement/IA22>, 5 pages.
Jensen, M. C., et al., "Human T Lymphocyte Genetic Modification with Naked DNA, " Mol. Ther. 1(1):49-55 (2000).
Jin, H.T., et al., "Cooperation of Tim-3 and PD-1 in CD8 T-Cell Exhaustion During Chronic Viral Infection," PNAS 107 (33):14733-14738 (2010).
Jin, L., et al., "Monoclonal Antibody-Mediated Targeting of CD123, IL-3 Receptor Alpha Chain, Eliminates Human Acute Myeloid Leukemic Stem Cells," Cell Stem Cell 5:31-42 (2009).
Jonnalagadda et al., "Chimeric antigen receptors (CARs) incorporating mutations in the IgG4 Fc spacer region to eliminate Fc receptor recognition results in improved CAR T cell persistence and anti-tumor efficacy", Journal for Immuno Therapy of Cancer 2013, 1(Suppl 1):p. 18, Nov. 7, 2013.
Jonnalagadda et al., "Chimeric Antigen Receptors With Mutated IgG4 Fc Spacer Avoid Fc Receptor Binding and Improve T Cell Persistence and Antitumor Efficacy", Molecular Therapy, vol. 23, No. 4, Apr. 2015, pp. 757-768.
Jordan, C.T., et al., "The Interleukin-3 Receptor Alpha Chain is a Unique Marker for Human Acute Myelogenous Leukemia Stem Cells," Leukemia 14:1777-1784 (2000).
Kalos M. et al. "T Cells with Chimeric Antigen Receptors Have Potent Antitumor Effects and Can Establish Memory in Patients with Advanced Leukemia," Sci. Transl. Med. 3:95ra73 (2011).
Kershaw et al., "Gene-engineered T cells for cancer therapy," Nature Reviews Cancer, Aug. 1, 2013, 13(8):525-541.

(56) References Cited

OTHER PUBLICATIONS

Kikushige, Y., et al., "TIM-3 Is a Promising Target to Selectively Kill Acute Myeloid Leukemia Stem Cells," Cell Stem Cell 7:708-717 (2010).
Kochenderfer, J. N., et al., "B-Cell Depletion and Remissions of Malignancy Along with Cytokine-Associated Toxicity in a Clinical Trial of Anti-CD19 Chimeric-Antigen-Receptor-Transduced T Cells," Blood 119:2709-2720 (2012).
Kochenderfer, J. N., et al., "Construction and Pre-Clinical Evaluation of an Anti-CD19 Chimeric Antigen Receptor," J. Immunother. 32(7):689-702 (2009).
Le Dieu, R., et al., "Peripheral Blood T Cells in Acute Myeloid Leukemia (AML) Patients at Diagnosis Have Abnormal Phenotype and Genotype and Form Defective Immune Synapses with AML Blasts," Blood 114:3909-3916 (2009).
Majeti, R., "Monoclonal Antibody Therapy Directed Against Human Acute Myeloid Leukemia Stem Cells," Oncogene 30:1009-1019 (2011).
Majeti, R., et al., "CD47 Is an Adverse Prognostic Factor and Therapeutic Antibody Target on Human Acute Myeloid Leukemia Stem Cells," Cell 138:286-299 (2009).
Manz, M. G., et al., "Prospective Isolation of Human Clonogenic Common Myeloid Progenitors," PNAS 99 (18):11872-11877 (2002).
Mardiros et al., "CD123-Specific Chimeric Antigen Receptor Redirected T Cells Exhibit Potent Cytolytic Activity and Multiple Effector Functions Against Acute Myeloid Leukemia without Altering Normal Hemotopoietic Colony Formation in Vitro", Blood, vol. 120, No. 21, Nov. 16, 2012, 2 pages.
Mardiros et al., "T cells expressing CD123-specific chimeric antigen receptors ehibit specific cytolytic effector functions and antitumor effects against human acute myeloid leukemia", Blood, Oct. 31, 2013, vol. 122, No. 18, pp. 3138-3148.
Mardiros et al., Materials and Methods, pp. 1-14, Supplement to "T cells expressing CD123-specific chimeric antigen receptors exhibit specific cytolytic effector functions and antitumor effects against human acute myeloid leukemia", Blood, Oct. 31, 2013, vol. 122, No. 18, pp. 3138-3148, published online Sep. 12, 2013.
Milone, M. C., et al., "Chimeric Receptors Containing CD137 Signal Transduction Domains Mediate Enhanced Survival of T Cells and Increased Antileukemic Efficacy In Vivo," Mol. Ther. 17(8):1453-1464 (2009).
Moeller, M., et al., "Sustained Antigen-Specific Antitumor Recall Response Mediated by Gene-Modified CD4+ T Helper-1 and CD8+ T Cells," Cancer Res. 67:11428-11437 (2007).
Munoz, L., et al., "Interleukin-3 Receptor Alpha Chain (CD123) is Widely Expressed in Hematologic Malignancies," Haematologica 86:1261-1269 (2001).
Nakazawa et al., "PiggyBac-mediated cancer immunotherapy using EBV-specific cytotoxic T-cells expressing HER2-specific chimeric antigen receptor." Molecular Therapy. Dec. 1, 2011, 19(12):2133-43.
Nguyen, P., et al., "Identification of a Murine CD28 Dileucine Motif that Suppresses Single-Chain Chimeric T-Cell Receptor Expression and Function," Blood 102:4320-4325 (2003).
Niwa et al., "IgG subclass-independent improvement of antibody-dependent cellular cytotoxicity by fucose removal from Asn297-linked oligosaccharides," J of Immunol Meth., 2005, 306:151-160.
Oka, Y., et al., Induction of WT1 (Wilms' Tumor Gene)-Specific Cytotoxic T Lymphocytes by VVT1 Peptide Vaccine and the Resultant Cancer Regression, PNAS 101(38):13885-13890 (2004).
Park et al., "Abstract 1944: In vitro analysis of suicide gene expression and function in human T lymphocytes transduced to express a tumor targeted chimeric antigen receptor," Cancer Research (2010) vol. 70, No. 8 Supplement, p. 1944 (Abstract 1944) [online], Internet <URL:http://cancerres.aacrjournals.org/content/70/8_Supplement/1944>, 4 pages.
Peinert, S., et al., "Gene-Modified T Cells as Immunotherapy for Multiple Myeloma and Acute Myeloid Leukemia Expressing the Lewis Y Antigen," Gene Therapy 17:678-686 (2010).
Pelloquin, F., et al., "Human B Lymphocytes Immortalization by Epstein-Barr Virus in the Presence of Cyclosporin A," In Vitro Cell. Dev. Biol. 22(12):689-694 (1986).
Reddy, M. P., et al., "Elimination of Fc Receptor-Dependent Effector Functions of a Modified IgG4 Monoclonal Antibody to Human CD4," J. Immunol. 164:1925-1933 (2000).
Riddell, S. R., et al., "The use of Anti-CD3 and Anti-CD28 Monoclonal Antibodies to Clone and Expand Human Antigen-Specific T Cells," J. Immunol. Methods 128:189-201 (1990).
Russian Office Action in Russian Application No. 2015140624, dated Feb. 13, 2018, 14 pages (with English Translation).
Sato, N., et al., "Expression and Factor-Dependent Modulation of the Interleukin-3 Receptor Subunits on Human Hematopoietic Cells," Blood 82:752-761 (1993).
Savoldo, B., et al., "CD28 Costimulation Improves Expansion and Persistence of Chimeric Antigen Receptor-Modified T Cells in Lymphoma Patients," J. Clin. Invest. 121(5): 1822-1826 (2011).
Schietinger, A., et al., "Bystander Killing of Cancer Requires the Cooperation of CD4+ and CD8+ T Cells During the Effector Phase," J. Exp. Med. 207(11):2469-2477 (2010).
Seder, R. A., et al., "T-Cell Quality in Memory and Protection: Implications for Vaccine Design," Nat. Rev. Immunol. 8:247-258 (2008).
Sievers, E. L., et al.,"Efficacy and Safety of Gemtuzumab Ozogamicin in Patients with CD33-Positive Acute Myeloid Leukemia in First Relapse," J. Clin. Oncol. 19:3244-3254 (2001).
Straathof, K. C., et al., "An Inducible Caspase 9 Safety Switch for 1-Cell Therapy," Blood 105:4247-4254 (2005).
Strohl, W. R., "Optimization of Fc-Mediated Effector Functions of Monoclonal Antibodies," Curr. Op. Biotech. 20:685-691 (2009).
Tettamanti et al., "Targeting of acute myeloid leukaemia by cytokine-induced killer cells redirected with a novel CD123-specific chimeric antigen receptor," British journal of haematology, May 1, 2013, 161(3):389-401.
Thokala et al., "Targeting Leukemias by CD 123 Specific Chimeric Antigen Receptor", Blood, vol. 118, No. 21, Nov. 18, 2011, 2 pages.
Till, B. G. et al., "CD20-Specific Adoptive Immunotherapy for Lymphoma Using a Chimeric Antigen Receptor with Both CD28 and 4-1BB Domains: Pilot Clinical Trial Results," Blood 119:3940-3950 (2012).
Tsimberidou, A.M., et al., "The Role of Gemtuzumab Ozogamicin in Acute Leukaemia Therapy," Br. J. Haematol. 132:398-409 (2005).
Walter, R. B., et al., "Acute Myeloid Leukemia Stem Cells and CD33-Targeted Immunotherapy," Blood 119:6198-6208 (2012).
Wang, X, et al., "A Transgene-Encoded Cell Surface Polypeptide for Selection, In Vivo Tracking, and Ablation of Engineered Cells," Blood 118:1255-1263 (2011).
Yoon, S.H., et al., "Adoptive Immunotherapy Using Human Peripheral Blood Lymphocytes Transferred with RNA Encoding Her-2/Neu-Specific Chimeric Immune Receptor in Ovarian Cancer Xenograft Model, " Cancer Gene Ther. 16:489-497 (2009).
Berger et al., "Adoptive transfer of effector CDS T cells derived from central memory cells establishes persistent T cell memory in primates," Journal of Clinical Investigation, Jan. 2008, 118(1):294-305.
Berger et al., "Analysis of transgene-specific immune responses that limit the in vivo persistence of adoptively transferred HSV-TK-modified donor T cells after allogeneic hematopoietic cell transplantation," Blood, Mar. 2006, 107(6):2294-2302.
Brenner et al., "Adoptive T Cell Therapy of Cancer," Current Opinion in Immunology, Apr. 2010, 22(2):251-257.
Brentjens et al., "CD19-targeted T cells rapidly induce molecular remissions in adults with chemotherapy-refractory acute lymphoblastic leukemia," Science Translational Medicine, Mar. 2013, 5(177):177, 19 pages.
Brentjens et al., "Genetically Targeted T Cells Eradicate Systemic Acute Lymphoblastic Leukemia Xenografts," Clinical Cancer Research, Sep. 2007, 13(18):5426-5435.
Cartellieri et al., "Chimeric Antigen Receptor-Engineered T Cells for Immunotherapy of Cancer," Journal of Biomedicine & Biotechnology, May 2010, 2010(1):956304, 13 pages.

(56) References Cited

OTHER PUBLICATIONS

Cieri et al., "IL-7 and IL-15 instruct the generation of human memory stem T cells from naive precursors," Blood, Jan. 2013, 121(4):573-584.

De Oliveira et al., "Modification of Hematopoietic Stem/Progenitor Cells with CD19- Specific Chimeric Antigen Receptors as a Novel Approach for Cancer Immunotherapy," Human Gene Therapy, Oct. 2013, 24(10):824-839.

Edelman et al., "The Covalent Structure of An Entire γG Immunoglobulin Molecule," Proceedings of the National Academy of Sciences, May 1969, 63(1):78-85.

Gattinoni et al., "Removal of homeostatic cytokine sinks by lymphodepletion enhances the efficacy of adoptively transferred tumor-specific $CD8^+T$ cells," Journal of Experimental Medicine, Oct. 2005, 202(7):907-912.

Grupp et al., "Chimeric Antigen Receptor-Modified T Cells for Acute Lymphoid Leukemia," New England Journal of Medicine, Apr. 2013, 368(16):1509-1518.

Guest et al., "The Role of Extracellular Spacer Regions in the Optimal Design of Chimeric Immune Receptors: Evaluation of Four Different scFvs and Antigens," Journal of Immunotherapy, May 2005, 28(3):203-211.

Haso et al., "Anti-CD22-chimeric antigen receptors targeting B-cell precursor acute lymphoblastic leukemia," Blood, Feb. 2013, 121(7):1165-1174.

Heslop et al., "Immunotherapy of Hematologic Malignancy," Hematology, Jan. 2003, 2003(1):331-349.

Hinrichs et al., "Human effector $CD8^+T$ cells derived from naive rather than memory subsets possess superior traits for adoptive immunotherapy," Blood, Jan. 2011, 117(3):808-814.

Hombach et al., "Tumor-Specific T Cell Activation by Recombinant Immunoreceptors: CD3ζ Signaling and CD28 Costimulation Are Simultaneously Required for Efficient IL-2 Secretion and Can Be Integrated Into One Combined CD28/CD3ζ Signaling Receptor Molecule," Journal of Immunology, Dec. 2001, 167(11):6123-6131.

Huang et al., "Genetically Modified T Cells Targeting Interleukin-11 Receptor α-Chain Kill Human Osteosarcoma Cells and Induce the Regression of Established Osteosarcoma Lung Metastases," Cancer Research, Jan. 2012, 72(1):271-281.

Imai et al., "Chimeric receptors with 4-1BB signaling capacity provoke potent cytotoxicity against acute lymphoblastic leukemia," Leukemia, Apr. 2004, 18(4):676-684.

Isaacs et al., "Therapy with Monoclonal Antibodies. II. The Contribution of Fcγ Receptor Binding and the Influence of $C_H1$ and $C_H3$ Domains on In Vivo Effector Function," Journal of Immunology, Oct. 1998, 161(8):3862-3869.

Ishikawa et al., "Development of functional human blood and immune systems in NOD/SCID/IL2 receptor γ chain$^{null}$ mice," Blood, Sep. 2005, 106(5):1565-1573.

Ito et al., "NOD/SCID/$\gamma_c^{null}$ mouse: an excellent recipient mouse model for engraftment of human cells," Blood, Nov. 2002, 100(9):3175-3182.

Jensen et al., "Antitransgene Rejection Responses Contribute to Attenuated Persistence of Adoptively Transferred CD20/CD19-Specific Chimeric Antigen Receptor Redirected T Cells in Humans," Biology of Blood and Marrow Transplantation, Sep. 2010, 16(9):1245-1256.

Jonnalagadda et al., "Engineering Human T Cells for Resistance to Methotrexate and Mycophenolate Mofetil as an In Vivo Cell Selection Strategy," PLoS One, Jun. 2013, 8(6):e65519, 10 pages.

Kahlon et al., "Specific Recognition and Killing of Glioblastoma Multiforme by Interleukin 13-Zetakine Redirected Cytolytic T Cells," Cancer Research, Dec. 2004, 64(24):9160-9166.

Kebriaei et al., "Infusing CD19-Directed T Cells to Augment Disease Control in Patients Undergoing Autologous Hematopoietic Stem-Cell Transplantation for Advanced B-Lymphoid Malignancies," Human Gene Therapy, May 2012, 23(5):444-450.

Kowolik et al., "CD28 Costimulation Provided through a CD19-Specific Chimeric Antigen Receptor Enhances In Vivo Persistence and Antitumor Efficacy of Adoptively Transferred T Cells," Cancer Research, Nov. 2006, 66(22): 10995-11004.

Nirula et al., "What is IgG4? A review of the biology of a unique immunoglobulin subtype," Current Opinion in Rheumatology, Jan. 2011, 23(1):119-124.

Overwijk et al., "Functions of γC cytokines in immune homeostasis: current and potential clinical applications," Clinical Immunology, Aug. 2009, 132(2):153-165.

Sazinsky et al., "Aglycosylated immunoglobulin $G_1$ variants productively engage activating Fc receptors," Proceedings of the National Academy of Sciences, Dec. 2008, 105(51):20167-20172.

Schroeder et al., "Structure and function of immunoglobulins," Journal of Allergy and Clinical Immunology, Feb. 2010, 125(2):S41-S52.

Stastny et al., "Medulloblastomas Expressing IL13Rγ2 are Targets for IL13-zetakine$^+$Cytolytic T cells," Journal of Pediatric Hematology/Oncology, Oct. 2007, 29(10):669-677.

Steplewski et al., "Biological activity of human-mouse IgG1, IgG2, IgG3, and IgG4 chimeric monoclonal antibodies with antitumor specificity," Proceedings of the National Academy of Sciences, Jul. 1988, 85(13):4852-4856.

Stoop et al., "Serum immunoglobulin levels in healthy children and adults," Clinical Experimental Immunology, Jan. 1969, 4(1):101-112.

Szymczak et al., "Correction of multi-gene deficiency in vivo using a single 'self-cleaving' 2A peptide-based retroviral vector," Nature Biotechnology, May 2004, 22(5):589-594.

UniProt Accession No. P01861, "IGHG4_HUMAN," dated Sep. 13, 2023, 72 pages.

Urba et al., "Redirecting T Cells," New England Journal of Medicine, Aug. 2011, 365(8):754-757.

Wang et al., "Engraftment of human central memory-derived effector $CD8^+T$ cells in immunodeficient mice," Blood, Feb. 2011, 117(6):1888-1898.

Wang et al., "Phenotypic and Functional Attributes of Lentivirus-Modified CD19- specific Human $CD8^+$Central Memory T Cells Manufactured at Clinical Scale," Journal of Immunotherapy, Nov. 2012, 35(9):689-701.

Wilkie et al., "Retargeting of Human T Cells to Tumor-Associated MUC1: The Evolution of a Chimeric Antigen Receptor," Journal of Immunology, Apr. 2008, 180(7):4901-4909.

Yang et al., "Modulating the differentiation status of ex vivo-cultured anti-tumor T cells using cytokine cocktails," Cancer Immunology Immunotherapy, Apr. 2013, 62:727-736.

Zhong et al., "Chimeric Antigen Receptors Combining 4-1BB and CD28 Signaling Domains Augment PI3kinase/AKT/Bcl-$X_L$ Activation and $CD8^+T$ Cell-mediated Tumor Eradication," Molecular Therapy, Feb. 2010, 18(2):413-420.

\* cited by examiner

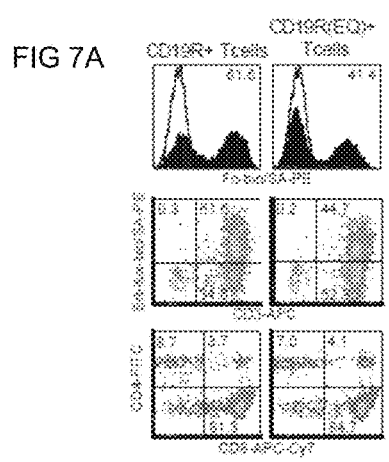
FIG 7A
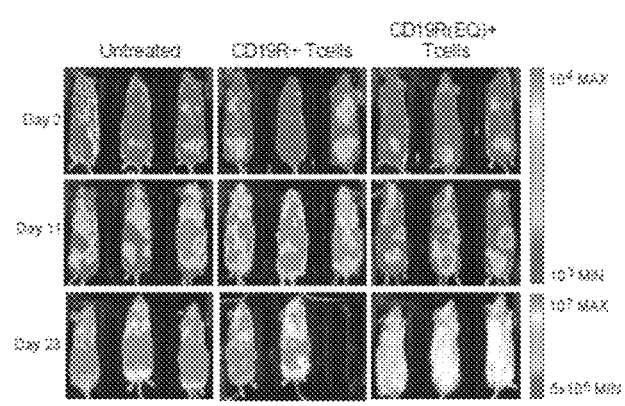
FIG 7B
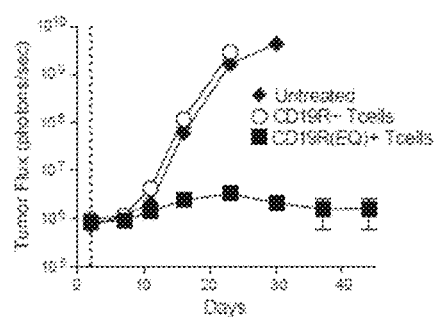
FIG 7C
FIG 7D

CHIMERIC ANTIGEN RECEPTORS (CARs) HAVING MUTATIONS IN THE FC SPACER REGION AND METHODS FOR THEIR USE

PRIORITY CLAIM

This application is a continuation of U.S. patent application Ser. No. 16/221,257, filed Dec. 14, 2018, which is a continuation of U.S. patent application Ser. No. 15/111,384, filed Jul. 13, 2016, which is a U.S. National Stage of International Application No. PCT/US2014/028961, filed Mar. 14, 2014, which claims priority to U.S. Provisional Patent Application No. 61/926,881, filed Jan. 13, 2014, which are incorporated herein in their entirety, including the drawings.

STATEMENT OF GOVERNMENT INTEREST

This invention was made with government support under Grant Nos P50 CA107399 and P01 CA030206 awarded by the National Institutes of Health (NIH). The Government has certain rights in the invention.

SEQUENCE LISTING

This application contains a Sequence Listing which has been submitted electronically in ASCII format and is hereby incorporated by reference in its entirety. Said ASCII text file, created on Oct. 25, 2021, is named SequenceListing.txt and is 52,760 bytes in size.

BACKGROUND

Adoptive immunotherapy using chimeric antigen receptor (CAR) expressing T cells is a promising cancer treatment, because these cells can directly recognize and kill antigen-expressing tumor cells in a human leukocyte antigen (HLA)-independent manner. However, besides a careful choice of the target tumor associated antigen, this therapeutic approach is highly dependent on the optimal molecular design of the CAR.

Although CARs that contain a TAA-specific scFv that produces an intracellular signal via a cytoplasmic costimulatory (e.g., CD28 or 4-1BB) domain fused to CD3-zeta have been shown in various systems to exhibit significant anti-tumor potency (Brentjens et al. 2013; Brentjens et al. 2011; Grupp et al. 2013; Kalos et al. 2011; Kochenderfer et al. 2012), immunological rejection and clearance by the host remains a challenge to effective cancer treatment.

Certain modifications in CAR design have been used to prevent the FcR-mediated clearance of therapeutic cells. For example, hinge/spacer sequences that do not originate from Ig Fc domains may be used, such as those from CD8a or CD28 (Brentjens et al. 2007; Kalos et al. 2011; Imai et al. 2004; Kochenderfer et al. 2009). Although these spacer sequences may alleviate FcR binding, their length may not endow CAR T cells with optimal potency when targeting certain antigens. For instance, when targeting 5T4, NCAM and MUC1 using CAR T cells, longer linker regions (i.e., longer than those derived from CD8α or CD28) were required for optimal potency (Wilkie et al. 2008; Guest et al. 2005). Thus, it would be desirable to design a CAR that addresses these challenges, while maintaining its efficacy in killing cancer cells.

SUMMARY

According to some embodiments, recombinant chimeric antigen receptors (CAR) having impaired binding to an Fc receptor (FcR) are provided. Such CARs may include, but are not limited to, an antigen recognition domain, a spacer domain derived from a modified immunoglobulin Fc region having one or more mutations in its CH2 region resulting in impaired binding to an FcR, and an intracellular signaling domain.

In another embodiment, a population of human immune cells transduced by a viral vector comprising an expression cassette that includes a CAR gene is provided. In some aspects, the CAR gene comprises a nucleotide sequence that encodes an antigen recognition domain, a spacer domain derived from a modified immunoglobulin Fc region having one or more mutations in its CH2 region resulting in impaired binding to an FcR, and an intracellular signaling domain, wherein the population of human immune cells expresses the CAR gene.

In another embodiment, a method of treating a cancer in a subject is provided. Such a method includes administering a population of human immune cells transduced with a CAR gene to the subject. In some aspects, the CAR gene comprises a nucleotide sequence that encodes an antigen recognition domain that targets a cancer associated antigen specific to the cancer, a spacer domain derived from a modified immunoglobulin Fc region having one or more mutations in its CH2 region resulting in impaired binding to an FcR, and an intracellular signaling domain.

Designing a CAR having a spacer domain that has decreased or impaired binding to FcRs (such as those described herein) helps prevent the FcR-expressing cells from recognizing and destroying, or unintentionally activating, the CAR-expressing immunotherapeutic cells in vivo. Therefore, such CARs help prevent immunological rejection and clearance of the cells meant to provide therapeutic benefit to patients

BRIEF DESCRIPTION OF THE DRAWINGS

FIG. 1A shows the schematics of the CD19R/EGFRt (top) and EGFRt (bottom) expression constructs that were used to gene modify T cells for engraftment studies. Sequence portions of the CD19-specific, CD28-costimulatory CAR (CD19R), the self-cleavable T2A, the huEGFRt, and the drug resistance DHFR$^{FS}$ and IMPDH2$^{IY}$ genes are indicated, along with the Elongation Factor 1 promoter sequences (EF-1p), the GM-CSF receptor alpha chain signal sequences (GMCSFRss), and the 3 nucleotide stop codons. FIG. 1B is a flow cytometric analysis of T cells administered to NSG mice for engraftment studies. $T_{CM}$-derived cells were left non-transduced (Non-Txd), or were transduced with lentiviral vectors containing the CD19R/EGFRt (CD19R) or EGFRt/DHFRFS/IMPDH2IY (EGFRt) constructs described in (FIG. 1A) and immunomagnetically selected for EGFRt-expression. The cells were then expanded in vitro for 19 days and analyzed for surface phenotype. Percentages of cells staining with antibodies specific for CD4 (top) or CD8 (bottom) vs. EGFRt are indicated in each histogram, using quadrants that were created based on negative control staining. In FIG. 1C, $10^7$ $T_{CM}$-derived cells as described in (FIG. 1B) were administered i.v. to NSG mice with irradiated NS0-IL15 support. Day 7 and 14 peripheral blood leukocytes that were harvested from each group (n=3-5 mice) were stained using FITC-conjugated anti-human CD45, and biotinylated-cetuximab followed by PE-conjugated streptavidin. Percentages of lymphocyte-gated, huCD45+ and huCD45+EGFRt+ cells are indicated in each histogram, using quadrants that were created based on negative control staining. Data are representative of 4 different experiments performed with $T_{CM}$-derived cells from multiple donors.

FIG. 3A shows the schematics of the parental CD19-specific CAR (CD19R), the CD19-specific CAR that contains the 2 point mutations, L235E and N297Q, in the CH2 portion of the IgG4 spacer (CD19R(EQ)), and the CD19-specific CAR that contains a truncated IgG4 spacer, where the whole CH2 domain is removed (CD19Rch2Δ). The ligand-binding scFv domain derived from the FMC63 mAb, the transmembrane and cytoplasmic signaling domains derived from huCD28, and the cytoplasmic signaling domain of huCD3ζ are also depicted. In FIG. 3B, $T_{CM}$-derived, EGFRt-enriched and expanded cells expressing either the parental CD19R, the EGFRt marker alone, the CD19R that has a single IgG4 point mutation at either amino acid 235 (CD19R(L235E)) or amino acid 297 (CD19R(N297Q)), the double-mutated CD19R(EQ) or the CH2-deleted CD19Rch2Δ were analyzed for transgene expression. Percentages of cells staining with antibodies specific for the Fc-containing CAR (top) or EGFRt (bottom) are indicated in each histogram, and based on an M1 gate set to detect ≤1% of that stained with SA-PE alone (black line). In FIG. 3C, the same cells used in FIG. 3B were used as effectors in a 4-hour chromium release assay against $^{51}$Cr-labeled CD19$^+$ LCL or SupB15 targets. LCL expressing the CD3 agonist OKT3 (LCL-OKT3) and CD19-negative K562 cells were used as positive- and negative-control targets, respectively. Mean percent chromium release±S.D. of triplicate wells at the indicated E:T ratios are depicted.

In FIG. 5A, mean percentages of CD45+EGFRt+ cells in the viable lymphocyte-gated population±S.E.M. are indicated. *, p<0.034 when compared to mice given CD19R-expressing cells using an unpaired Student's t-test. FIG. 5B shows representative histograms (i.e., median 3 of each group of 5 mice) that are depicted with quadrants created based on control staining. Percentages of huCD45+ EGFRt+ cells are indicated in each histogram.

FIGS. 6A-6E show that $T_{CM}$-derived cells expressing CARs with mutated IgG4 spacer exhibit enhanced therapeutic efficacy according to some embodiments. 1.5×$10^6$ ffLuc$^+$ LCL cells were administered i.v. into NSG mice on day 0, and then 5×$10^6$ CAR+ $T_{CM}$-derived cells ($10^7$ cells total) expressing either the EGFRt marker alone, the parental CD19R, the double point-mutated CD19R(EQ), or the CH2-deleted CD19Rch2Δ were infused i.v. into NSG mice on day 3. LCL tumor growth was then monitored by Xenogen imaging. FIG. 6A shows a flow cytometric analysis depicting the CAR profiles of the input $T_{CM}$-derived cells (used at day 23 after bead stimulation and lentitransduction). Percentages of immunoreactive cells are indicated in each histogram, and based on an M1 gate set to detect ≤1% of that stained with SA-PE alone (black line). FIG. 6B shows mean flux levels (±S.E.M.) of luciferase activity are depicted for each group (n=6). FIG. 6C shows representative bioluminescence images of NSG mice at day 21 are depicted for each group. FIG. 6D shows mean percentages (+S.E.M.) of CD45$^+$ EGFRt$^+$ cells in the viable lymphocyte-gated population of peripheral blood at day 21 are indicated. *, p<0.035 when compared to mice given CD19R-expressing cells using an unpaired Student's t-test. FIG. 6E shows a Kaplan Meier analysis of survival for each group. Log-rank (Mantel-COX) tests were used to perform statistical analyses of survival between groups; *, p=0.0009 when compared to mice that received T cells expressing the parental CD19R.

FIGS. 7A-7D show that bulk T cells expressing CD19R (EQ) exhibit enhanced therapeutic efficacy according to one embodiment. 1.5×$10^6$ ffLuc$^+$ LCL cells were administered i.v. into NSG mice on day 0, and then 5×$10^6$ CAR$^+$ T cells expressing either the parental CD19R or the double point-mutated CD19R(EQ) were infused i.v. into NSG mice on day 2. LCL tumor growth was then monitored by Xenogen imaging. FIG. 7A shows a flow cytometric analysis of the CAR (top), EGFRt vs. CD3 (middle) and CD4 vs CD8 (bottom) profiles of the input T cells (used at day 21 after bead stimulation and lentitransduction). Percentages of immunoreactive cells as determined by histogram subtraction (top), or based on quadrants that were drawn according to the staining of mock-transduced cells and isotype control staining (middle, bottom) are depicted in each histogram. FIG. 7B shows representative bioluminescence images of NSG mice at day 2, 11 and 23 are depicted for each group. FIG. 7C shows mean flux levels (±S.E.) of luciferase activity are depicted for each group (n=3). FIG. 7D shows a Kaplan-Meier analysis of survival for each group. Log-rank (Mantel-COX) tests were used to perform statistical analyses of survival between groups; *, p=0.0295 when compared to mice that received T cells expressing the parental CD19R.

FIG. 8A shows a flow cytometric analysis depicting the CAR profiles of the input $T_{CM}$-derived cells (used at day 26 after bead stimulation and lentitransduction). Percentages of cells staining with antibodies specific for the Fc-containing CAR (top) or EGFRt (bottom) are indicated in each histogram, and based on an M1 gate set to detect 1% of that stained with SA-PE alone (black line). FIG. 8B shows mean percentages of CD45+ EGFRt+ cells in the viable lymphocyte-gated population±S.E.M. are indicated. *, p=0.004 and **, p=0.057 when using an unpaired Student's t-test to compare mice infused with $T_{CM}$-derived cells expressing the parental CD19R vs. CD19R(EQ). FIG. 8C shows representative histograms (i.e., median 2 of each group of 4-6 mice) are depicted with quadrants created based on control staining. Percentages of huCD45+ EGFRt+ cells are indicated in each histogram.

DETAILED DESCRIPTION

Figure 1A:
FIGS. 1A-1C show that CD19-specific CAR-expressing T cells do not efficiently engraft in NSG mice according to one embodiment.

The following examples are intended to illustrate various embodiments of the invention. As such, the specific embodiments discussed are not to be construed as limitations on the scope of the invention. It will be apparent to one skilled in the art that various equivalents, changes, and modifications may be made without departing from the scope of invention, and it is understood that such equivalent embodiments are to be included herein. Further, all references cited in the disclosure are hereby incorporated by reference in their entirety, as if fully set forth herein.

Chimeric Antigen Receptors

According to the embodiments described herein, recombinant chimeric antigen receptors (CARs) to target cancer-related antigens and methods for their use are provided. As described by the embodiments below, a CAR may include a series of protein or peptide domains including, but not limited to, one or more of an antigen binding domain, a spacer domain, a transmembrane domain, an intracellular signaling domain and an intracellular costimulatory domain.

In some embodiments, a gene encoding the CAR is provided, wherein the gene includes a nucleotide or nucleic acid sequence which includes a series of regions which encode an amino acid sequence corresponding to the protein or peptide domains of the CAR described herein. Because the degeneracy of the genetic code is known, any amino acid sequences disclosed herein are also indicative of all degenerate nucleic acid codons corresponding to each amino acid in said sequences. As such, it is understood that the embodiments describing CARs and their domains may be provided as a gene comprising a nucleic acid sequence as well as the amino acid sequences encoded by said genes.

In one embodiment, a CAR may include, but is not limited to, an antigen binding domain, a spacer domain, optionally at least one intracellular signaling domain and optionally at least one intracellular costimulatory domain.

In other embodiments, a CAR may include, but is not limited to, an antigen binding domain, a spacer domain, and at least one intracellular signaling domain.

In other embodiments, a CAR may include, but is not limited to, an antigen binding domain, a spacer domain, at least one intracellular signaling domain and at least one intracellular costimulatory domain.

Antigen Binding Domain

A CAR antigen binding domain may include a nucleotide sequence that, when expressed as a peptide or polypeptide, binds an epitope of a cancer-related antigen. In some embodiments, a cancer-related antigen may be any antigen expressed by or overexpressed by a cancer cell (e.g., a tumor cell, a neoplastic cell, a malignant cell, or any other cancerous cell), and may be a protein, peptide, carbohydrate, glycoprotein, ganglioside, proteoglycan, or any combination or complex thereof. In some aspects, the cancer-related antigen is a tumor specific antigen (TSA) that may be expressed only on cancer or tumor cells, while in other aspects, the cancer-related antigen is a tumor-associated antigen (TAA) that may be expressed on both tumor cells and normal cells. In other aspects, the cancer-related antigen may be a product of a mutated oncogene or tumor suppressor gene, or a product of another mutated gene (e.g., overexpressed or aberrantly expressed cellular proteins, tumor antigens produced by oncogenic viruses, oncofetal antigens, altered cell surface glycolipids or glycoproteins, or cell type-specific differentiation antigens).

According to the embodiments described herein, cancer-related antigens that may be targeted by a CAR antigen binding domain described herein include, but are not limited to, 5T4, 8H9, $\alpha_v\beta_6$ integrin, alphafetoprotein (AFP), B7-H6, CA-125 carbonic anhydrase 9 (CA9), CD19, CD20, CD22, CD30, CD33, CD38, CD44, CD44v6, CD44v7/8, CD52, CD123, CD171, carcionoembryonic antigen (CEA), EGFrvIII, epithelial glycoprotein-2 (EGP-2), epithelial glycoprotein-40 (EGP-40), ErbB1/EGFR, ErbB2/HER2/neu/EGFR2, ErbB3, ErbB4, epithelial tumor antigen (ETA), FBP, fetal acetylcholine receptor (AchR), folate receptor-α, G250/CAIX, ganglioside 2 (GD2), ganglioside 3 (GD3), HLA-A1, HLA-A2, high molecular weight melanoma-associated antigen (HMW-MAA), IL-13 receptor α2, KDR, k-light chain, Lewis Y (LeY), L1 cell adhesion molecule, melanoma-associated antigen (MAGE-A1), mesothelin, Murine CMV infected cells, mucin-1 (MUC1). mucin-16 (MUC16), natural killer group 2 member D (NKG2D) ligands, nerve cell adhesion molecule (NCAM), NY-ESO-1, Oncofetal antigen (h5T4), prostate stem cell antigen (PSCA), prostate-specific membrane antigen (PSMA), receptor-tyrosine kinase-like orphan receptor 1 (ROR1), TAA targeted by mAb IgE, tumor-associated glycoprotein-72 (TAG-72), tyrosinase, and vascular endothelial growth factor (VEGF) receptors. In some embodiments, the antigen binding domain that is part of a CAR described herein targets CD19 or CD123.

An antigen binding domain may be any targeting moiety which targets an antigen associated with cancer. In some embodiments, the antigen binding domain is an antibody or functional fragment of an antibody. An antibody refers to an immunoglobulin molecule that specifically binds to, or is immunologically reactive with an antigen or epitope, and includes both polyclonal and monoclonal antibodies, as well as functional antibody fragments, including but not limited to fragment antigen binding (Fab) fragments, F(ab')2 fragments, Fab' fragments, Fv fragments, recombinant IgG (rIgG) fragments, single chain variable fragments (scFv) and single domain antibodies (e.g., sdAb, sdFv, nanobody) fragments. The term "antibody or functional fragment thereof" also includes genetically engineered or otherwise modified forms of immunoglobulins, such as intrabodies, peptibodies, chimeric antibodies, fully human antibodies, humanized antibodies, and heteroconjugate antibodies (e.g., bispecific antibodies, diabodies, triabodies, tetrabodies, tandem di-scFv, tandem tri-scFv). Unless otherwise stated, the term "antibody" should be understood to encompass functional antibody fragments thereof. In one embodiment, the antigen binding domain is an scFv having a heavy ($V_H$) and light chain ($V_L$). In other embodiments, the antigen binding domain is an scFv that targets CD19 or CD123. In such embodiments, the scFv that targets CD19 may have the following amino acid sequence:

```
CD19R V_L
                                        (SEQ ID NO: 1)
DIQMTQTTSS LSASLGDRVT ISCRASQDIS KYLNWYQQKP

DGTVKLLIYH TSRLHSGVPS RFSGSGSGTD YSLTISNLEQ

EDIATYFCQQ GNTLPYTFGG GTKLEIT

CD19R V_H
                                        (SEQ ID NO: 2)
EVKLQESGPG LVAPSQSLSV TCTVSGVSLP DYGVSWIRQP

PRKGLEWLGV IWGSETTYYN SALKSRLTII KDNSKSQVFL

KMNSLQTDDT AIYYCAKHYY YGGSYAMDYW GQGTSVTVSS
```

And the scFv that targets CD123 may have one of the following amino acid sequences:

```
CD123 V_H1
                                        (SEQ ID NO: 3)
QIQLVQSGPE LKKPGETVKI SCKASGYIFT NYGMNWVKQA

PGKSFKWMGW INTYTGESTY SADFKGRFAF SLETSASTAY

LHINDLKNED TATYFCARSG GYDPMDYWGQ GTSVTVSS

CD123 V_H2
                                        (SEQ ID NO: 4)
QVQLQQPGAE LVRPGASVKL SCKASGYTFT SYWMNWVKQR

PDQGLEWIGR IDPYDSETHY NQKFKDKAIL TVDKSSSTAY

MQLSSLTSED SAVYYCARGN WDDYWGQGTT LTVSS

CD123 V_L1
                                        (SEQ ID NO: 5)
DIVLTQSPAS LAVSLGQRAT ISCRASESVD NYGNTFMHWY

QQKPGQPPKL LIYRASNLES GIPARFSGSG SRTDFTLTIN

PVEADDVATY YCQQSNEDPP TFGAGTKLEL K

CD123 V_L2
                                        (SEQ ID NO: 6)
DVQITQSPSY LAASPGETIT INCRASKSIS KDLAWYQEKP

GKTNKLLIYS GSTLQSGIPS RFSGSGSGTD FTLTISSLEP

EDFAMYYCQQ HNKYPYTFGG GTKLEIK
```

Spacer Domain

The spacer domain (also referred to as a "hinge region" or "spacer/hinge region") may be derived from or include at least a portion of an immunoglobulin Fc region, for example, an IgG1 Fc region, an IgG2 Fc region, an IgG3 Fc region, an IgG4 Fc region, an IgE Fc region, an IgM Fc region, or an IgA Fc region. In certain embodiments, the spacer domain includes at least a portion of an IgG1, an IgG2, an IgG3, an IgG4, an IgE, an IgM, or an IgA immunoglobulin Fc region that falls within its CH2 and CH3 domains. In some embodiments, the spacer domain may also include at least a portion of a corresponding immunoglobulin hinge region. In some embodiments, the spacer domain is derived from or includes at least a portion of a modified immunoglobulin Fc region, for example, a modified IgG1 Fc region, a modified IgG2 Fc region, a modified IgG3 Fc region, a modified IgG4 Fc region, a modified IgE Fc region, a modified IgM Fc region, or a modified IgA Fc region. The modified immunoglobulin Fc region may have one or more mutations (e.g., point mutations, insertions, deletions, duplications) resulting in one or more amino acid substitutions, modifications, or deletions that cause impaired binding of the spacer domain to an Fc receptor (FcR). In some aspects, the modified immunoglobulin Fc region may be designed with one or more mutations which result in one or more amino acid substitutions, modifications, or deletions that cause impaired binding of the spacer domain to one or more FcR including, but not limited to, FcγRI, FcγR2A, FcγR2B1, FcγR2B2, FcγR3A, FcγR3B, FcεRI, FcεR2, FcαRI, Fcα/μR, or FcRn.

Some amino acid sequences within the Fc CH2 domain have been identified as having involvement in antibody-FcR interaction (Strohl, 2009). FcRs, such as FcγRI, are integral membrane proteins located on immune cells including natural killer (NK) cells and macrophages, which then use this Fc-targeting ability to carry out various immune functions such as antibody-dependent cell-mediated cytotoxicity (ADCC) and phagocytosis.

Impairment of binding to FcRs by the spacer domain prevents the FcR-expressing cells from recognizing and destroying, or unintentionally activating, the CAR-expressing immunotherapeutic cells in vivo, thereby helping to prevent immunological rejection and clearance of the cells meant to provide therapeutic benefit to patients. The mutations described herein also contribute to reducing the CAR's off-target effects and thereby increasing its specificity and efficacy.

An "amino acid modification" or an "amino acid substitution" or a "substitution," as used herein, mean an amino acid substitution, insertion, and/or deletion in a protein or peptide sequence. An "amino acid substitution" or "substitution" as used herein, means a replacement of an amino acid at a particular position in a parent peptide or protein sequence with another amino acid. For example, the substitution S228P refers to a variant protein or peptide, in which the serine at position 228 is replaced with proline.

Amino acid substitutions can be made by a mutation such that a particular codon in the nucleic acid sequence encoding the protein or peptide is changed to a codon which codes for a different amino acid. Such a mutation is generally made by making the fewest nucleotide changes possible. A substitution mutation of this sort can be made to change an amino acid in the resulting protein in a non-conservative manner (i.e., by changing the codon from an amino acid belonging to a grouping of amino acids having a particular size or characteristic to an amino acid belonging to another grouping) or in a conservative manner (i.e., by changing the codon from an amino acid belonging to a grouping of amino acids having a particular size or characteristic to an amino acid belonging to the same grouping). Such a conservative change generally leads to less change in the structure and function of the resulting protein.

The following are examples of various groupings of amino acids:

Amino acids with nonpolar R groups: Alanine, Valine, Leucine, Isoleucine, Proline, Phenylalanine, Tryptophan, Methionine.

Amino acids with uncharged polar R groups: Glycine, Serine, Threonine, Cysteine, Tyrosine, Asparagine, Glutamine.

Amino acids with charged polar R groups (negatively charged at Ph 6.0): Aspartic acid, Glutamic acid.

Basic amino acids (positively charged at pH 6.0): Lysine, Arginine, Histidine (at pH 6.0).

Another grouping may be those amino acids with phenyl groups: Phenylalanine, Tryptophan, Tyrosine.

Another grouping may be according to molecular weight (i.e., size of R groups) as shown below:

| | |
|---|---|
| Glycine | 75 |
| Alanine | 89 |
| Serine | 105 |
| Proline | 115 |
| Valine | 117 |
| Threonine | 119 |
| Cysteine | 121 |
| Leucine | 131 |
| Isoleucine | 131 |
| Asparagine | 132 |
| Aspartic acid | 133 |
| Glutamine | 146 |
| Lysine | 146 |
| Glutamic acid | 147 |
| Methionine | 149 |
| Histidine (at pH 6.0) | 155 |
| Phenylalanine | 165 |
| Arginine | 174 |
| Tyrosine | 181 |
| Tryptophan | 204 |

In certain embodiments, the spacer domain is derived from a modified IgG1, IgG2, IgG3, or IgG4 Fc region that includes one or more amino acid residues substituted with an amino acid residue different from that present in an unmodified hinge. The one or more substituted amino acid residues are selected from, but not limited to one or more amino acid residues at positions 220, 226, 228, 229, 230, 233, 234, 235, 234, 237, 238, 239, 243, 247, 267, 268, 280, 290, 292, 297, 298, 299, 300, 305, 309, 218, 326, 330, 331, 332, 333, 334, 336, 339, or a combination thereof.

In some embodiments, the spacer domain is derived from a modified IgG1, IgG2, IgG3, or IgG4 Fc region that includes, but is not limited to, one or more of the following amino acid residue substitutions: C220S, C226S, S228P, C229S, P230S, E233P, V234A, L234V, L234F, L234A, L235A, L235E, G236A, G237A, P238S, S239D, F243L, P247I, S267E, H268Q, S280H, K290S, K290E, K290N, R292P, N297A, N297Q, S298A, S298G, S298D, S298V, T299A, Y300L, V305I, V309L, E318A, K326A, K326W, K326E, L328F, A330L, A330S, A331S, P331S, I332E, E333A, E333S, E333S, K334A, A339D, A339Q, P396L, or a combination thereof.

In some embodiments, the spacer domain is derived from an IgG Fc region having one or more modifications made to its CH2-CH3 region, wherein the unmodified IgG CH2-CH3 region corresponds to one of the following amino acid sequences:

```
IgG1
APELLGGPSV FLFPPKPKDT LMISRTPEVT CVVVDVSHED

PEVKFNWYVD GVEVHNAKTK

IgG2
APP-VAGPSV FLFPPKPKDT LMISRTPEVT CVVVDVSHED

PEVQFNWYVD GVEVHNAKTK

IgG3
APELLGGPSV FLFPPKPKDT LMISRTPEVT CVVVDVSHED

PEVQFKWYVD GVEVHNAKTK

IgG4
APEFLGGPSV FLFPPKPKDT LMISRTPEVT CVVVDVSQED

PEVQFNWYVD GVEVHNAKTK

IgG1
PREEQYNSTY RVVSVLTVLH QDWLNGKEYK CKVSNKALPA

PIEKTISKAK GQPREPQVYT

IgG2
PREEQFNSTF RVVSVLTVVH QDWLNGKEYK CKVSNKGLPA

PIEKTISKTK GQPREPQVYT

IgG3
PREEQYNSTF RVVSVLTVLH QDWLNGKEYK CKVSNKALPA

PIEKTISKTK GQPREPQVYT

IgG4
PREEQFNSTY RVVSVLTVLH QDWLNGKEYK CKVSNKGLPS

SIEKTISKAK GQPREPQVYT

IgG1
LPPSRISKAK NQVSLTCLVK GFYPSDIAVE WESNGQPENN

YKTTPPVLDS DGSFFLYSKL

IgG2
LPPSREEMTK NQVSLTCLVK GFYPSDISVE WESNGQPENN

YKTTPPMLDK DGSFFLYSKL

IgG3
LPPSREEMTK NQVSLTCLVK GFYPSDIAVE WESSGQPENN

YNTTPPMLDS DGSFFLYSKL

IgG4
LPPSQEEMTK NQVSLTCLVK GFYPSDIAVE WESNGQPENN

YKTTPPVLDS DGSFFLYSRL

IgG1
                                (SEQ ID NO: 7)
TVDKSRWQQG NVFSCSVMHE ALHNHYTQKS LSLSPGK

IgG2
                                (SEQ ID NO: 8)
TVDKSRWQQG NVFSCSVMHE ALHNHYTQKS LSLSPGK

IgG3
                                (SEQ ID NO: 9)
TVDKSRWQQG NIFSCSVMHE ALHNRFTQKS LSLSPGK

IgG4
                                (SEQ ID NO: 10)
TVDKSRWQEG NVFSCSVMHE ALHNHYTQKS LSLSLGK
```

In some embodiments, the spacer domain is derived from an IgG Fc region having one or more modifications made to its hinge region, wherein the unmodified IgG hinge region corresponds to one of the following amino acid sequences:

```
IgG1
                                (SEQ ID NO: 11)
EPKSCDKTHTCPPCP

IgG2
                                (SEQ ID NO: 12)
ERKCCVECPPCP
```

```
IgG3
                                         (SEQ ID NO: 13)
ELKTPLGDTTHTCPRCPEPKSCDTPPPCPRCPEPKSCDTPPPCPRCPEPK

SCDTPPPCPRCP

IgG4
                                         (SEQ ID NO: 14)
ESKYGPPCPSCP
```

In some embodiments, the spacer domain is derived from an IgG4 Fc region having the following amino acid sequence:

```
   Pos. 219
   ESKYGPPCPS CPAPEFLGGP SVFLFPPKPK DTLMISRTPE

VTCVVVDVSQ EDPEVQFNWY

Pos. 279
   VDGVEVHNAK TKPREEQFNS TYRVVSVLTV LHQDWLNGKE

YKCKVSNKGL PSSIEKTISK

Pos. 339
   AKGQPREPQV YTLPPSQEEM TKNQVSLTCL VKGFYPSDIA

VEWESNGQPE NNYKTTPPVL

Pos. 399
                                         (SEQ ID NO: 15)
   DSDGSFFLYS RLTVDKSRWQ EGNVFSCSVM HEALHNHYTQ

KSLSLSLGK
```

In certain embodiments, the spacer domain is derived from a modified IgG4 Fc that includes one or more amino acid residues substituted with an amino acid residue different from that present in an unmodified IgG4 Fc region. The one or more substituted amino acid residues are selected from, but not limited to one or more amino acid residues at positions 220, 226, 228, 229, 230, 233, 234, 235, 234, 237, 238, 239, 243, 247, 267, 268, 280, 290, 292, 297, 298, 299, 300, 305, 309, 218, 326, 330, 331, 332, 333, 334, 336, 339, 396, or a combination thereof.

In some embodiments, the spacer domain is derived from a modified IgG4 Fc region that includes, but is not limited to, one or more of the following amino acid residue substitutions: 220S, 226S, 228P, 229S, 230S, 233P, 234A, 234V, 234F, 234A, 235A, 235E, 236A, 237A, 238S, 239D, 243L, 247I, 267E, 268Q, 280H, 290S, 290E, 290N, 292P, 297A, 297Q, 298A, 298G, 298D, 298V, 299A, 300L, 305I, 309L, 318A, 326A, 326W, 326E, 328F, 330L, 330S, 331S, 331S, 332E, 333A, 333S, 333S, 334A, 339D, 339Q, 396L, or a combination thereof, wherein the amino acid in the unmodified IgG4 Fc region is substituted with the above identified amino acids at the indicated position.

In some embodiments, the spacer domain is derived from a modified IgG4 Fc region that includes, but is not limited to, two or more (i.e., "double mutated"), three or more (i.e., "triple mutated"), four or more, five or more, or more than five of the following amino acid residue substitutions: 220S, 226S, 228P, 229S, 230S, 233P, 234A, 234V, 234F, 234A, 235A, 235E, 236A, 237A, 238S, 239D, 243L, 247I, 267E, 268Q, 280H, 290S, 290E, 290N, 292P, 297A, 297Q, 298A, 298G, 298D, 298V, 299A, 300L, 305I, 309L, 318A, 326A, 326W, 326E, 328F, 330L, 330S, 331S, 331S, 332E, 333A, 333S, 333S, 334A, 339D, 339Q, 396L, or a combination thereof, wherein the amino acid in the unmodified IgG4 Fc region is substituted with the above identified amino acids at the indicated position.

In some embodiments, the spacer domain is derived from a modified IgG4 Fc region that includes, but is not limited to, a substitution of proline (P) in place of serine (S) at position 228 (S228P), a substitution of leucine (L) in place of glutamic acid (E) at position 235 (L235E), a substitution of asparagine (N) in place of glutamine (Q) at position 297 (N297Q), or a combination thereof. In certain embodiments, a modified IgG4 Fc region has a single mutation, as indicated in the following amino acid sequences (mutations are in bold and underlined):

```
   ESKYGPPCPS CPAPEFEGGP SVFLFPPKPK DTLMISRTPE

VTCVVVDVSQ EDPEVQFNWY VDGVEVHNAK TKPREEQFNS

TYRVVSVLTV LHQDWLNGKE YKCKVSNKGL PSSIEKTISK

AKGQPREPQV YTLPPSQEEM TKNQVSLTCL VKGFYPSDIA

VEWESNGQPE NNYKTTPPVL DSDGSFFLYS RLTVDKSRWQ

EGNVFSCSVM HEALHNHYTQ KSLSLSLGK (L235E mutation; SEQ ID NO: 16)

ESKYGPPCPS CPAPEFLGGP SVFLFPPKPK DTLMISRTPE

VTCVVVDVSQ EDPEVQFNWY VDGVEVHNAK TKPREEQFQS

TYRVVSVLTV LHQDWLNGKE YKCKVSNKGL PSSIEKTISK

AKGQPREPQV YTLPPSQEEM TKNQVSLTCL VKGFYPSDIA

VEWESNGQPE NNYKTTPPVL DSDGSFFLYS RLTVDKSRWQ

EGNVFSCSVM HEALHNHYTQ KSLSLSLGK (N297Q mutation; SEQ ID NO: 17)
```

In other embodiments, the spacer domain is derived from a modified IgG4 Fc region that is double mutated to include an L235E substitution and an N297Q substitution ("EQ"). In another embodiment, the modified IgG4 Fc region is triple mutated to include an S228P substitution, an L235E substitution, and an N297Q substitution ("S228P+L235E+N297Q"). In certain embodiments, a modified IgG4 Fc and/or hinge region may include a nucleotide sequence which encodes an amino acid sequence selected from the following (mutations are in bold and underlined):

```
   ESKYGPPCPS CPAPEFEGGP SVFLFPPKPK DTLMISRTPE

VTCVVVDVSQ EDPEVQFNWY VDGVEVHNAK TKPREEQFQS

TYRVVSVLTV LHQDWLNGKE YKCKVSNKGL PSSIEKTISK

AKGQPREPQV YTLPPSQEEM TKNQVSLTCL VKGFYPSDIA

VEWESNGQPE NNYKTTPPVL DSDGSFFLYS RLTVDKSRWQ

EGNVFSCSVM HEALHNHYTQ KSLSLSLGK (EQ mutation; SEQ ID NO: 18)

ESKYGPPCPP CPAPEFEGGP SVFLFPPKPK DTLMISRTPE

VTCVVVDVSQ EDPEVQFNWY VDGVEVHNAK TKPREEQFQS

TYRVVSVLTV LHQDWLNGKE YKCKVSNKGL PSSIEKTISK
```

```
AKGQPREPQV YTLPPSQEEM TKNQVSLTCL VKGFYPSDIA

VEWESNGQPE NNYKTTPPVL DSDGSFFLYS RLTVDKSRWQ

EGNVFSCSVM HEALHNHYTQ KSLSLSLGK (S228P + mutation; L235E + N297Q SEQ ID NO: 19)
```

In certain embodiments, the spacer domain is derived from a modified immunoglobulin Fc region that includes one or more deletions of all of a part of its CH2 domain. In one embodiment, the spacer domain is derived from a modified IgG4 Fc region that includes one or more deletions of all of a part of its CH2 domain ("ch2Δ"). In one aspect of such an embodiment, the spacer domain may include a nucleotide sequence which encodes the following amino acid sequence:

```
ESKYGPPCPP CPGGGSSGGG SGGQPREPQV YTLPPSQEEM

TKNQVSLTCL VKGFYPSDIA VEWESNGQPE NNYKTTPPVL

DSDGSFFLYS RLTVDKSRWQ EGNVFSCSVM HEALHNHYTQ

KSLSLSLGK (ch2Δ mutation/deletion; SEQ ID

NO: 20)
```

In some embodiments, the spacer domain may be modified to substitute the immunoglobulin Fc region for a spacer that does not have the ability to bind FcR, such as the hinge region of CD8a. Alternatively, the Fc spacer region of the hinge may be deleted. Such substitutions would reduce or eliminate Fc binding.

The term "position," as used herein, is a location in the sequence of a protein. Positions may be numbered sequentially, or according to an established format, for example a Kabat position or an EU position or EU index as in Kabat. For all positions discussed herein, numbering is according to the EU index or EU numbering scheme (Kabat et al., 1991, Sequences of Proteins of Immunological Interest, 5th Ed., United States Public Health Service, National Institutes of Health, Bethesda, hereby entirely incorporated by reference). The EU index or EU index as in Kabat or EU numbering scheme refers to the numbering of the EU antibody (Edelman et al., 1969, Proc Natl Acad Sci USA 63:78-85, which is hereby entirely incorporated by reference). Kabat positions, while also well known in the art, may vary from the EU position for a given position. For example, the S228P and L235E substitutions described above refer to the EU position. However, these substitutions may also correspond to Kabat positions 241 (S241P) and 248 (L248E).

Transmembrane and Signaling Domains

The intracellular signaling domain may include any suitable T cell receptor (TCR) complex signaling domain, or portion thereof. In some embodiments, the intracellular signaling domain is derived from a CD3 complex. In some embodiments, the intracellular signaling domain is a TCR zeta-chain (ζ-chain) signaling domain. In certain embodiments, a ζ-chain signaling domain may include a nucleotide sequence which encodes an amino acid sequence as follows:

```
                                    (SEQ ID NO: 21)
RVKFSRSADA PAYQQGQNQL YNELNLGRRE EYDVLDKRRG

RDPEMGGKPR RKNPQEGLYN ELQKDKMAEA YSEIGMKGER

RRGKGHDGLY QGLSTATKDT YDALHMQALP PR
```

The intracellular signaling domain may be associated with any suitable costimulatory domain including, but not limited to, a 4-1BB costimulatory domain, an OX-40 costimulatory domain, a CD27 costimulatory domain, a CD28 costimulatory domain, a DAP10 costimulatory domain, an inducible costimulatory (ICOS) domain, or a 2B4 costimulatory domain. According to the embodiments described herein, a CAR may include at least one costimulatory signaling domain. In one aspect the CAR has a single costimulatory signaling domain, or it may include two or more costimulatory signaling domains such as those described above. In another aspect, the costimulatory domain may be made up of a single costimulatory domain such as those described above, or alternatively, may be made up of two or more portions of two or more costimulatory domains. Alternatively, in some embodiments, the CAR does not include a costimulatory signaling domain. In one embodiment, the CAR includes a costimulatory signaling domain which is a CD28 costimulatory domain. In this embodiment, such a modified CD28 costimulatory domain may have one or more amino acid substitutions or modifications including, but not limited to a substitution of leucine-leucine (LL) to glycine-glycine (GG). In certain embodiments, a modified costimulatory signaling domain region may include a nucleotide sequence which encodes an amino acid sequence selected from the following:

```
                                    (SEQ ID NO: 22)
RSKRSRGGHS DYMNMTPRRP GPTRKHYQPY APPRDFAAYR S
```

The signaling domain or domains may include a transmembrane domain selected from a CD28 transmembrane domain, a CD3 transmembrane domain, or any other suitable transmembrane domain known in the art. In some embodiments, the transmembrane domain is a CD28 transmembrane domain. In certain embodiments, a modified costimulatory signaling domain region may include a nucleotide sequence which encodes an amino acid sequence selected from the following:

```
                                    (SEQ ID NO: 23
           MFWVLVVVGG VLACYSLLVT VAFIIFWV
```

Expression of CAR Genes and Transduction of T Cells

In some embodiments, the CAR gene is part of an expression cassette. In some embodiments, the expression cassette may—in addition to the CAR gene—also include an accessory gene. When expressed by a T cell, the accessory gene may serve as a transduced T cell selection marker, an in vivo tracking marker, or a suicide gene for transduced T cells.

In some embodiments, the accessory gene is a truncated EGFR gene (EGFRt). An EGFRt may be used as a non-immunogenic selection tool (e,g., immunomagnetic selection using biotinylated cetuximab in combination with anti-biotin microbeads for enrichment of T cells that have been lentivirally transduced with EGFRt-containing constructs), tracking marker (e.g., flow cytometric analysis for tracking T cell engraftment), and suicide gene (e.g., via Cetuximab/Erbitux® mediated antibody dependent cellular cytotoxicity (ADCC) pathways). An example of a truncated EGFR (EGFRt) gene that may be used in accordance with the embodiments described herein is described in International Application No. PCT/US2010/055329, the subject matter of which is hereby incorporated by reference as if fully set forth herein. In other embodiments, the accessory gene is a truncated CD19 gene (CD19t).

In another embodiment, the accessory gene is an inducible suicide gene. A suicide gene is a recombinant gene that will cause the cell that the gene is expressed in to undergo programmed cell death or antibody mediated clearance at a desired time. In one embodiment, an inducible suicide gene that may be used as an accessory gene is an inducible caspase 9 gene (see Straathof et al. (2005). An inducible caspase 9 safety switch for T-cell therapy. *Blood*. June 1; 105(11): 4247-4254, the subject matter of which is hereby incorporated by reference as if fully set forth herein).

In some embodiments, the expression cassette that include a CAR gene described above may be inserted into a vector for delivery—via transduction or transfection—of a target cell. Any suitable vector may be used, for example, a bacterial vector, a viral vector, or a plasmid. In some embodiments, the vector is a viral vector selected from a retroviral vector, a lentiviral vector, a poxvirus vector, an adenoviral vector, or an adeno-associated viral vector. In some embodiments, the vector may transduce a population of healthy immune cells, e.g., T cells. Successfully transduced or transfected target cells express the one or more genes that are part of the expression cassette.

As such, one or more populations of immune cells, such as T cells, may be transduced with a CAR gene such as those described above. The transduced T cells may be from a donor, or may be from a subject having a cancer and who is in need of a treatment for the cancer. In some embodiments, the transduced T cells are used in an adoptive immunotherapy treatment for the treatment of the cancer (residues in bold/underline indicate substitutions). In some embodiments, the transduced T cells express a CAR gene that encodes an amino acid sequence selected from SEQ ID NOS:24-27:

```
CD19R(L235E)28Z (SEQ ID NO: 24):
MLLLVTSLLL CELPHPAFLL IPDIQMTQTT SSLSASLGDR

VTISCRASQD ISKYLNWYQQ KPDGTVKLLI YHTSRLHSGV

PSRFSGSGSG TDYSLTISNL EQEDIATYFC QQGNTLPYTF

GGGTKLEITG STSGSGKPGS GEGSTKGEVK LQESGPGLVA

PSQSLSVTCT VSGVSLPDYG VSWIRQPPRK GLEWLGVIWG

SETTYYNSAL KSRLTIIKDN SKSQVFLKMN SLQTDDTAIY

YCAKHYYYGG SYAMDYWGQG TSVTVSSESK YGPPCPPCPA

PEFEGGPSVF LFPPKPKDTL MISRTPEVTC VVVDVSQEDP

EVQFNWYVDG VEVHNAKTKP REEQFNSTYR VVSVLTVLHQ

DWLNGKEYKC KVSNKGLPSS IEKTISKAKG QPREPQVYTL

PPSQEEMTKN QVSLTCLVKG FYPSDIAVEW ESNGQPENNY

KTTPPVLDSD GSFFLYSRLT VDKSRWQEGN VFSCSVMHEA

LHNHYTQKSL SLSLGKMFWV LVVVGGVLAC YSLLVTVAFI

IFWVRSKRSR GGHSDYMNMT PRRPGPTRKH YQPYAPPRDF

AAYRSGGGRV KFSRSADAPA YQQGQNQLYN ELNLGRREEY

DVLDKRRGRD PEMGGKPRRK NPQEGLYNEL QKDKMAEAYS

EIGMKGERRR GKGHDGLYQG LSTATKDTYD ALHMQALPPR

CD19R(N297Q)28Z (SEQ ID NO: 25):
MLLLVTSLLL CELPHPAFLL IPDIQMTQTT SSLSASLGDR

VTISCRASQD ISKYLNWYQQ KPDGTVKLLI YHTSRLHSGV

PSRFSGSGSG TDYSLTISNL EQEDIATYFC QQGNTLPYTF

GGGTKLEITG STSGSGKPGS GEGSTKGEVK LQESGPGLVA

PSQSLSVTCT VSGVSLPDYG VSWIRQPPRK GLEWLGVIWG

SETTYYNSAL KSRLTIIKDN SKSQVFLKMN SLQTDDTAIY

YCAKHYYYGG SYAMDYWGQG TSVTVSSESK YGPPCPPCPA

PEFLGGPSVF LFPPKPKDTL MISRTPEVTC VVVDVSQEDP

EVQFNWYVDG VEVHNAKTKP REEQFQSTYR VVSVLTVLHQ

DWLNGKEYKC KVSNKGLPSS IEKTISKAKG QPREPQVYTL

PPSQEEMTKN QVSLTCLVKG FYPSDIAVEW ESNGQPENNY

KTTPPVLDSD GSFFLYSRLT VDKSRWQEGN VFSCSVMHEA

LHNHYTQKSL SLSLGKMFWV LVVVGGVLAC YSLLVTVAFI

IFWVRSKRSR GGHSDYMNMT PRRPGPTRKH YQPYAPPRDF

AAYRSGGGRV KFSRSADAPA YQQGQNQLYN ELNLGRREEY

DVLDKRRGRD PEMGGKPRRK NPQEGLYNEL QKDKMAEAYS

EIGMKGERRR GKGHDGLYQG LSTATKDTYD ALHMQALPPR

CD19R(EQ)28Z (SEQ ID NO: 26):
MLLLVTSLLL CELPHPAFLL IPDIQMTQTT SSLSASLGDR

VTISCRASQD ISKYLNWYQQ KPDGTVKLLI YHTSRLHSGV

PSRFSGSGSG TDYSLTISNL EQEDIATYFC QQGNTLPYTF

GGGTKLEITG STSGSGKPGS GEGSTKGEVK LQESGPGLVA

PSQSLSVTCT VSGVSLPDYG VSWIRQPPRK GLEWLGVIWG

SETTYYNSAL KSRLTIIKDN SKSQVFLKMN SLQTDDTAIY

YCAKHYYYGG SYAMDYWGQG TSVTVSSESK YGPPCPPCPA

PEFEGGPSVF LFPPKPKDTL MISRTPEVTC VVVDVSQEDP

EVQFNWYVDG VEVHNAKTKP REEQFQSTYR VVSVLTVLHQ

DWLNGKEYKC KVSNKGLPSS IEKTISKAKG QPREPQVYTL

PPSQEEMTKN QVSLTCLVKG FYPSDIAVEW ESNGQPENNY

KTTPPVLDSD GSFFLYSRLT VDKSRWQEGN VFSCSVMHEA

LHNHYTQKSL SLSLGKMFWV LVVVGGVLAC YSLLVTVAFI

IFWVRSKRSR GGHSDYMNMT PRRPGPTRKH YQPYAPPRDF

AAYRSGGGRV KFSRSADAPA YQQGQNQLYN ELNLGRREEY

DVLDKRRGRD PEMGGKPRRK NPQEGLYNEL QKDKMAEAYS

EIGMKGERRR GKGHDGLYQG LSTATKDTYD ALHMQALPPR

CD19RCH2ΔCD28Z (SEQ ID NO: 27):
MLLLVTSLLL CELPHPAFLL IPDIQMTQTT SSLSASLGDR

VTISCRASQD ISKYLNWYQQ KPDGTVKLLI YHTSRLHSGV

PSRFSGSGSG TDYSLTISNL EQEDIATYFC QQGNTLPYTF
```

```
        GGGTKLEITG STSGSGKPGS GEGSTKGEVK LQESGPGLVA

PSQSLSVTCT VSGVSLPDYG VSWIRQPPRK GLEWLGVIWG

SETTYYNSAL KSRLTIIKDN SKSQVFLKMN SLQTDDTAIY

YCAKHYYYGG SYAMDYWGQG TSVTVSSESK YGPPCPPCPG

GGSSGGGSGG QPREPQVYTL PPSQEEMTKN QVSLTCLVKG

FYPSDIAVEW ESNGQPENNY KTTPPVLDSD GSFFLYSRLT

VDKSRWQEGN VFSCSVMHEA LHNHYTQKSL SLSLGKMFWV

LVVVGGVLAC YSLLVTVAFI IFWVRSKRSR GGHSDYMNMT

PRRPGPTRKH YQPYAPPRDF AAYRSGGGRV KFSRSADAPA

YQQGQNQLYN ELNLGRREEY DVLDKRRGRD PEMGGKPRRK

NPQEGLYNEL QKDKMAEAYS EIGMKGERRR GKGHDGLYQG

LSTATKDTYD ALHMQALPPR
```

Further, the one or more populations of T cells may be part of a pharmaceutically acceptable composition for delivery for administration to a subject. In addition to the CAR-transduced T cells, the pharmaceutically effective composition may include one or more pharmaceutically effective carriers. A "pharmaceutically acceptable carrier" as used herein refers to a pharmaceutically acceptable material, composition, or vehicle that is involved in carrying or transporting a treatment of interest from one tissue, organ, or portion of the body to another tissue, organ, or portion of the body. Such a carrier may comprise, for example, a liquid, solid, or semi-solid filler, solvent, surfactant, diluent, excipient, adjuvant, binder, buffer, dissolution aid, solvent, encapsulating material, sequestering agent, dispersing agent, preservative, lubricant, disintegrant, thickener, emulsifier, antimicrobial agent, antioxidant, stabilizing agent, coloring agent, or some combination thereof.

Each component of the carrier is "pharmaceutically acceptable" in that it must be compatible with the other ingredients of the composition and must be suitable for contact with any tissue, organ, or portion of the body that it may encounter, meaning that it must not carry a risk of toxicity, irritation, allergic response, immunogenicity, or any other complication that excessively outweighs its therapeutic benefits.

Some examples of materials which can serve as pharmaceutically-acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) natural polymers such as gelatin, collagen, fibrin, fibrinogen, laminin, decorin, hyaluronan, alginate and chitosan; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as trimethylene carbonate, ethyl oleate and ethyl laurate; (13) agar; (14) buffering agents, such as magnesium hydroxide and aluminum hydroxide; (15) alginic acid (or alginate); (16) pyrogen-free water; (17) isotonic saline; (18) Ringer's solution; (19) alcohol, such as ethyl alcohol and propane alcohol; (20) phosphate buffer solutions; (21) thermoplastics, such as polylactic acid, polyglycolic acid, (22) polyesters, such as polycaprolactone; (23) self-assembling peptides; and (24) other non-toxic compatible substances employed in pharmaceutical formulations such as acetone.

The pharmaceutical compositions may contain pharmaceutically acceptable auxiliary substances as required to approximate physiological conditions such as pH adjusting and buffering agents, toxicity adjusting agents and the like, for example, sodium acetate, sodium chloride, potassium chloride, calcium chloride, sodium lactate and the like.

In one embodiment, the pharmaceutically acceptable carrier is an aqueous carrier, e.g. buffered saline and the like. In certain embodiments, the pharmaceutically acceptable carrier is a polar solvent, e.g. acetone and alcohol.

The concentration of CAR-transduced T cells in these formulations can vary widely, and will be selected primarily based on fluid volumes, viscosities, organ size, body weight and the like in accordance with the particular mode of administration selected and the biological system's needs.

In certain embodiments, populations of T cells transduced with a CAR gene (i.e., CAR-transduced T cells) such as those described herein cells used in the methods for targeting and killing cancer or tumor cells may be grown in a cell culture. In certain aspects of this embodiment, the method may be used in an in vitro or research setting to investigate the role of a particular cancer-related antigen in the etiology of a cancer, or to evaluate the targeting abilities of new CAR constructs.

Treatment of Cancer with CAR-Transduced T Cells

According to some embodiments, CAR genes and populations of T cells that are transduced with CAR genes such as those described above may be used in methods for treating cancer in a subject. Such methods may include a step of administering a therapeutically effective amount of at least one population of T cells transduced with at least one CAR gene to the subject. In these embodiments, the population of CAR-transduced T-cells expresses one or more CAR genes, such as those described above. In certain embodiments, the T cells are transduced with and express a single mutant gene construct such as a CD19R(L235E) or CD19R(N297Q) construct as described herein, a double mutant gene construct which has both a L235E and N297Q mutation (e.g., CD19R(EQ)), as described herein, or a deletion gene construct (e.g., CD19Rch2Δ), as described herein. When such cells are administered via an adoptive immunotherapy treatment, the transduced T cells specifically target and lyse the cancer-related antigen expressing cells (i.e., cancer cells) in vivo, thereby delivering their therapeutic effect of eliminating cancer cells.

Cancers that may be treated using the population of transduced T cells may include, but are not limited to, Acute Lymphoblastic Leukemia (ALL), Acute Myeloid Leukemia (AML), Adrenocortical, Carcinoma, AIDS-Related Cancers, Anal Cancer, Appendix Cancer, Astrocytomas, Atypical Teratoid/Rhabdoid Tumor, Central Nervous System, Basal Cell Carcinoma, Bile Duct Cancer, Bladder Cancer, Bone Cancer, Osteosarcoma and Malignant Fibrous Histiocytoma, Brain Stem Glioma, Brain Tumors, Breast Cancer, Bronchial Tumors, Burkitt Lymphoma, Carcinoid Tumors, Central Nervous System Cancers, Cervical Cancer, Chordoma, Chronic Lymphocytic Leukemia (CLL), Chronic Myelogenous Leukemia (CML), Chronic Myeloproliferative Disorders, Colon Cancer, Colorectal Cancer, Craniopharyngioma, Cutaneous T-Cell Lymphoma, Embryonal Tumors, Central Nervous System, Endometrial Cancer, Ependymoblastoma, Ependymoma, Esophageal Cancer, Esthesioneuroblastoma, Ewing Sarcoma Family of Tumors Extracranial Germ Cell Tumor, Extragonadal Germ Cell Tumor Extrahepatic Bile Duct Cancer, Eye Cancer Fibrous Histiocytoma of Bone, Malignant, and Osteosarcoma, Gallbladder Cancer, Gastric (Stomach) Cancer, Gastrointestinal Carcinoid Tumor, Gastrointestinal Stromal Tumors (GIST)—see Soft Tissue Sarcoma, Germ Cell Tumor, Gestational Trophoblastic Tumor, Glioma, Hairy Cell Leukemia, Head and Neck Cancer, Heart Cancer, Hepatocellular (Liver) Cancer, Histiocytosis, Hodgkin Lymphoma, Hypopharyngeal Cancer, Intraocular Melanoma, Islet Cell Tumors (Endocrine Pancreas), Kaposi Sarcoma, Kidney cancer, Langerhans Cell Histiocytosis, Laryngeal Cancer, Leukemia, Lip and Oral Cavity Cancer, Liver Cancer (Primary), Lobular Carcinoma In Situ (LCIS), Lung Cancer, Lymphoma, Macroglobulinemia, Male Breast Cancer, Malignant Fibrous Histiocytoma of Bone and Osteosarcoma, Medulloblastoma, Medulloepithelioma, Melanoma, Merkel Cell Carcinoma, Mesothelioma, Metastatic Squamous Neck Cancer with Occult Primary Midline Tract Carcinoma Involving NUT Gene, Mouth Cancer, Multiple Endocrine Neoplasia Syndromes, Multiple Myeloma/Plasma Cell Neoplasm, Mycosis Fungoides, Myelodysplastic Syndromes, Myelodysplastic/Myeloproliferative Neoplasms, Myelogenous Leukemia, Chronic (CML), Myeloid Leukemia, Acute (AML), Myeloma, Multiple, Myeloproliferative Disorders, Nasal Cavity and Paranasal Sinus Cancer, Nasopharyngeal Cancer, Neuroblastoma, Non-Hodgkin Lymphoma, Non-Small Cell Lung Cancer, Oral Cancer, Oral Cavity Cancer, Oropharyngeal Cancer, Osteosarcoma and Malignant Fibrous Histiocytoma of Bone, Ovarian Cancer, Pancreatic Cancer, Papillomatosis, Paraganglioma, Paranasal Sinus and Nasal Cavity Cancer, Parathyroid Cancer, Penile Cancer, Pharyngeal Cancer, Pheochromocytoma, Pineal Parenchymal Tumors of Intermediate Differentiation, Pineoblastoma and Supratentorial Primitive Neuroectodermal Tumors, Pituitary Tumor, Plasma Cell Neoplasm/Multiple Myeloma, Pleuropulmonary Blastoma, Pregnancy and Breast Cancer, Primary Central Nervous System (CNS) Lymphoma, Prostate Cancer, Rectal Cancer, Renal Cell (Kidney) Cancer, Renal Pelvis and Ureter, Transitional Cell Cancer, Retinoblastoma, Rhabdomyosarcoma, Salivary Gland Cancer, Sarcoma, Sézary Syndrome, Small Cell Lung Cancer, Small Intestine Cancer, Soft Tissue Sarcoma, Squamous Cell Carcinoma, Squamous Neck Cancer, Stomach (Gastric) Cancer, Supratentorial Primitive Neuroectodermal Tumors, T-Cell Lymphoma, Cutaneous, Testicular Cancer, Throat Cancer, Thymoma and Thymic Carcinoma, Thyroid Cancer, Transitional Cell Cancer of the Renal Pelvis and Ureter, Trophoblastic Tumor, Ureter and Renal Pelvis Cancer, Urethral Cancer, Uterine Cancer, Uterine Sarcoma, Vaginal Cancer, Vulvar Cancer, Waldenström Macroglobulinemia, and Wilms Tumor.

The population or populations of T cells transduced with the CAR gene or genes that may be used in accordance with the methods described herein may be administered, by any suitable route of administration, alone or as part of a pharmaceutical composition. A route of administration may refer to any administration pathway known in the art, including but not limited to intracranial, parenteral, or transdermal. "Parenteral" refers to a route of administration that is generally associated with injection, including infraorbital, infusion, intraarterial, intracapsular, intracardiac, intradermal, intramuscular, intraperitoneal, intrapulmonary, intraspinal, intrasternal, intrathecal, intratumoral, intrauterine, intravenous, subarachnoid, subcapsular, subcutaneous, transmucosal, or transtracheal. In certain embodiments, transduced T cells are administered intravenously or intrathecally.

The term "effective amount" as used herein refers to an amount of an agent, compound, treatment or therapy that produces a desired effect. For example, a population of cells may be contacted with an effective amount of an agent, compound, treatment or therapy to study its effect in vitro (e.g., cell culture) or to produce a desired therapeutic effect ex vivo or in vitro. An effective amount of an agent, compound, treatment or therapy may be used to produce a therapeutic effect in a subject, such as preventing or treating a target condition, alleviating symptoms associated with the condition, or producing a desired physiological effect. In such a case, the effective amount of a compound is a "therapeutically effective amount," "therapeutically effective concentration" or "therapeutically effective dose." The precise effective amount or therapeutically effective amount is an amount of the composition that will yield the most effective results in terms of efficacy of treatment in a given subject or population of cells. This amount will vary depending upon a variety of factors, including but not limited to the characteristics of the compound (including activity, pharmacokinetics, pharmacodynamics, and bioavailability), the physiological condition of the subject (including age, sex, disease type and stage, general physical condition, responsiveness to a given dosage, and type of medication) or cells, the nature of the pharmaceutically acceptable carrier or carriers in the formulation, and the route of administration. Further an effective or therapeutically effective amount may vary depending on whether the compound is administered alone or in combination with another compound, drug, therapy or other therapeutic method or modality. One skilled in the clinical and pharmacological arts will be able to determine an effective amount or therapeutically effective amount through routine experimentation, namely by monitoring a cell's or subject's response to administration of a compound and adjusting the dosage accordingly. For additional guidance, see Remington: The Science and Practice of Pharmacy, $21^{st}$ Edition, Univ. of Sciences in Philadelphia (USIP), Lippincott Williams & Wilkins, Philadelphia, PA, 2005, which is hereby incorporated by reference as if fully set forth herein. Agents, compounds treatments or therapies that may be used in an effective amount or therapeutically effective amount to produce a desired effect in accordance with the embodiments described herein may include, but are not limited to, a CAR gene, an expression cassette that includes a CAR gene, a vector that delivers an expression cassette that includes a CAR gene to a target cell such as a T cell, and a population of T cells that are transduced with a CAR gene.

The terms "treating" or "treatment" of a condition may refer to preventing the condition, slowing the onset or rate of development of the condition, reducing the risk of developing the condition, preventing or delaying the development of symptoms associated with the condition, reducing or ending symptoms associated with the condition, generating a complete or partial regression of the condition, or some combination thereof. Treatment may also mean a prophylactic or preventative treatment of a condition.

The term "subject" as used herein refers to a human or animal, including all mammals such as primates (particularly higher primates), sheep, dog, rodents (e.g., mouse or rat), guinea pig, goat, pig, cat, rabbit, and cow. In some embodiments, the subject is a human.

In certain embodiments, the methods for treating cancer may include a step of administering a therapeutically effective amount of a first population of T cells transduced with a first CAR gene in combination with a therapeutically effective amount of a second population of T cells transduced with a second CAR gene.

In other embodiments, CAR-transduced T cells may be administered in combination with one or more additional anti-cancer therapies. "In combination" or "in combination with," as used herein, means in the course of treating the same cancer in the same subject using two or more agents, drugs, therapeutics, procedures, treatment regimens, treatment modalities or a combination thereof, in any order. This includes simultaneous administration, as well as in a temporally spaced order of up to several days apart. Such combination treatment may also include more than a single administration of any one or more of the agents, drugs, therapeutics, procedures, treatment regimens, and treatment modalities. Further, the administration of the two or more agents, drugs, therapeutics, procedures, treatment regimens, treatment modalities or a combination thereof may be by the same or different routes of administration.

Additional anti-cancer therapies that may be used in accordance with the methods described herein may include one or more anti-cancer procedures, treatment modalities, anti-cancer therapeutics or a combination thereof. In some embodiments, the CAR-transduced T cells may be administered in combination with one or more anti-cancer procedures or treatment modalities including, but not limited to, stem cell transplantation (e.g., bone marrow transplant or peripheral blood stem cell transplant using allogenic stem cells, autologous stem cells; or a non-myeloablative transplant), radiation therapy, or surgical resection. In other embodiments, the CAR-transduced T cells may be administered in combination with one or more anti-cancer therapeutics or drugs that may be used to treat cancer including, but not limited to, chemotherapeutics and other anti-cancer drugs, immunotherapeutics, targeted therapeutics, or a combination thereof.

Chemotherapeutics and other anti-cancer drugs that may be administered in combination with the CAR-transduced T cells in accordance with the embodiments described herein include, but are not limited to, all-trans-retinoic acid (ATRA), arsenic trioxide, anthracycline antibiotics and pharmaceutically acceptable salts thereof (e.g., doxorubicin hydrochloride, daunorubicin hydrochloride, idarubicin, mitoxantrone), alkylating agents (e.g., cyclophosphamide, laromustine), antimetabolite analogs (cytarabine, 6-thioguanine, 6-mercaptopurine, methotrexate), demethylating agents (e.g., decitabine, 5-azacytidine), nucleic acid synthesis inhibitors (e.g., hydroxyurea), topoisomerase inhibitors (e.g., etoposide), vinca alkaloids (e.g., vincristine sulfate), or a combination thereof (e.g., "ADE," which is a combination treatment that includes a combination of Cytarabine (Ara-C), Daunorubicin Hydrochloride and Etoposide).

Immunotherapeutics that may be administered in combination with the CAR-transduced T cells in accordance with the embodiments described herein include, but are not limited to, immune modulatory reagents (e.g., STAT3 inhibitors, Lenalidomide) and therapeutic monoclonal antibodies. The therapeutic monoclonal antibodies may be designed to target one or more additional cancer-related antigens Targeted therapeutics that may be administered in combination with the CAR-transduced T cells in accordance with the embodiments described herein include, but are not limited to, tyrosine kinase inhibitors (imatinib, dasatinib, nilotinib, sunitinib), farnesyl transferase inhibitors (e.g., tipifarnib), FLT inhibitors, and c-Kit (or CD117) inhibitors (imatinib, dasatinib, nilotinib).

The following examples are intended to illustrate various embodiments of the invention. As such, the specific embodiments discussed are not to be construed as limitations on the scope of the invention. For example, although the example below relates to an embodiment for a CAR that targets CD19, it is appreciated that a CAR may be generated to target any antigen. It will be apparent to one skilled in the art that various equivalents, changes, and modifications may be made without departing from the scope of invention, and it is understood that such equivalent embodiments are to be included herein. Further, all references cited in the disclosure are hereby incorporated by reference in their entirety, as if fully set forth herein.

EXAMPLES

Example 1: Chimeric Antigen Receptors (CARs) Incorporating Mutations in the IgG4 Fc Spacer Region Avoid Fc Receptor Mediated Recognition and Clearance of CAR T Cells, Resulting in Improved T Cell Persistence and Anti-Tumor Efficacy To determine whether cellular FcR-mediated interactions play a role in immunological rejection and clearance, or even unintentional activation of adoptively transferred CAR-expressing T cells, a CD19-specific CAR that has been mutated at one or two sites within the CH2 region (L235E and/or N297Q) of its IgG4 Fc spacer—referred to herein as CD19R(L235E), CD19R(N297Q) or CD19R(EQ)—as well as a CD19-specific CAR that has a CH2 deletion in its IgG4 Fc spacer—referred to herein as CD19Rch2Δ. T cells expressing these mutated CAR were then compared to T cells expressing a non-mutated CAR (CD19R) or only a truncated EGFR molecule (EGFRt) as a tracking marker (Wang et al. 2011), for in vitro FcγR binding and CAR-mediated cytolytic activity, as well as in vivo engraftment and therapeutic efficacy. The results provide evidence that elimination of cellular FcγR interactions improves the persistence and anti-tumor responses of adoptively transferred CAR-expressing T cells.

Materials and Methods

DNA Constructs and Lentiviral Vectors. The CD19R28Z-T2A-EGFRt_epHIV7 lentiviral construct contains a) the chimeric antigen receptor (CAR) sequence consisting of the $V_H$ and $V_L$ gene segments of the CD19-specific FMC63 mAb, an IgG4 hinge-$C_{H2}$-$C_{H3}$, the transmembrane and cytoplasmic signaling domains of the costimulatory molecule CD28 that contains gg mutations that enhance chimeric receptor expression and function (Nguyen et al. 2003), and the cytoplasmic domain of the CD3ζ chain (Kowolik et al. 2006); b) ribosomal skip T2A sequence (Szymczak et al. 2004) and c) the truncated EGFR sequence (Wang et al. 2011a). The EGFRt-T2A-DHFR$^{FS}$-T2A-IMPDH2$^{IY}$_epHIV7 lentiviral vector was generated as previously described (Jonnalagadda et al. 2013). The CD19R (L235E)28Z-T2A-EGFRt_epHIV7, CD19R(N297Q)28Z-T2A-EGFRt_epHIV7 and CD19R(EQ)28Z-T2A-EGFRt_epHIV7 vectors were generated by site directed mutagenesis using the QuikChange II XL kit (Agilent Technologies, Santa Clara, CA) of a codon optimized CD19R28Z_pGA plasmid that had been synthesized by Geneart, digested with NheI/RsrII and ligated with a similarly digested CD19R28Z-T2A-EGFRt_epHIV7. The CD19Rch2Δ28Z-T2A-EGFRt_epHIV7 vector was generated from a codon optimized CD19R-HL-CH3(CO)_pMK-RQ plasmid that had been synthesized by Geneart, digested with NheI/RsrII and ligated with a similarly digested CD19R28Z-T2A-EGFRt_epHIV7.

Cell Lines and Maintenance. Human peripheral blood mononuclear cells (PBMCs) were isolated as described (Wang, 2011b) from heparinized peripheral blood obtained from discard kits containing residual blood components of healthy donors that had undergone apheresis at the City of Hope National Medical Center (COHNMC). Because this was de-identified discard blood material, informed consent was waived with the approval of the COHNMC Internal Review Board (IRB protocol #09025), and the COHNMC Office of Human Subjects Protection. $T_{CM}$ isolation (using CD14- and CD45RA-depletion followed by CD62L-selection), anti-CD3/CD28 bead stimulation and lentiviral-mediated transduction was then done as previously described (Wang et al. 2012). In some cases, transduced T cells were immunomagnetically enriched for EGFRt expression as previously described (Wang et al. 2011a).

EBV-transformed lymphoblastoid cell lines (LCL) and LCL that expressed OKT3 (LCL-OKT3) (Wang et al. 2011b) or ffLuc+ LCL cells were cultured in RPMI 1640 (Irvine Scientific, Santa Ana, CA) supplemented with 10% heat-inactivated fetal calf serum (FCS, Hyclone, Logan, UT) 2 mM L-glutamine (Irvine Scientific), and 25 mM HEPES (Irvine Scientific). ffLuc+ LCL were generated by transduction with lentiviral vector eGFP-ffluc_epHIV7 at an MOI of 20 in the presence of 5 µg/mL polybrene in 500 uL medium, and subsequent purification by sorting GFP+ cells.

Mouse myeloma cells secreting human homeostatic IL-15 cytokine (NSO-IL15) were generated as previously described (Wang et al. 2011b).

SupB15 and K562 leukemia cell lines (ATCC) were grown in the corresponding ATCC recommended media.

Antibodies and Flow Cytometry. Fluorochrome-conjugated isotype controls, anti-CD3, anti-CD4, anti-CD8, anti-CD45 and streptavidin were obtained from BD Biosciences (San Jose, CA). Biotinylated anti-Fc was purchased from Jackson ImmunoResearch Laboratories, Inc. (West Grove, PA). Generation of biotinylated-cetuximab was previously described (Wang et al. 2011a). Biotinylated huFcγR1, muFcγR1, huFcγR2a, huFcγR2b, and muFcγR2b were obtained from Sino Biological, Inc. (Beijing, P.R. China). The percentage of immunofluorescent cells were analyzed by a FACScalibur system (BD Biosciences), and the percentage of cells in a region of analysis were calculated using FCS Express V3 (De Novo Software, CA, USA).

In vivo T Cell Engraftment and Therapy. All mouse experiments were approved by the COHNMC Institute Animal Care and Use Committee. For engraftment studies, 6-10 week old NOD/Scid IL-2RγC$^{null}$ (NSG) mice were injected intravenously (i.v.) on day 0 with $10^7$ of the indicated $T_{CM}$-derived cells, and intraperitoneal (i.p.) injections three times a week of $2\times10^7$ irradiated NS0-IL15 to provide a systemic supply of human IL-15 in vivo. Peripheral blood was harvested from retro-orbital bleeds, red blood cells were lysed and cell suspensions were analyzed by flow cytometry. For the therapeutic study, $1.5\times10^6$ ffLuc$^+$ LCL cells were administered i.v. into 6-8 week old NSG mice on day 0, and then $5\times10^6$ of the indicated CAR+ $T_{CM}$-derived cells were administered i.v. on day 3. Luciferase activity was measured by Xenogen imaging as previously described (Kahlon et al. 2004).

Chromium-release Assays. 4-hour $^{51}$Cr-release assays were performed as previously described (Stastny et al. 2007) using the indicated effector/target cell ratios.

Results

Figure 1B:
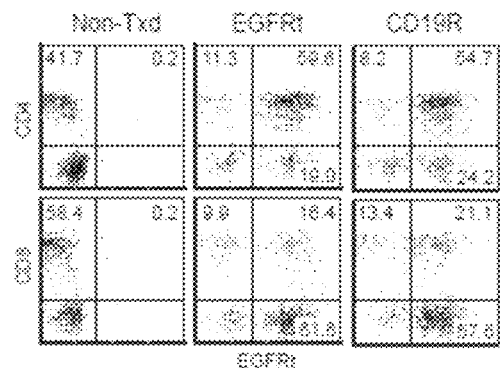
Figure 1C:
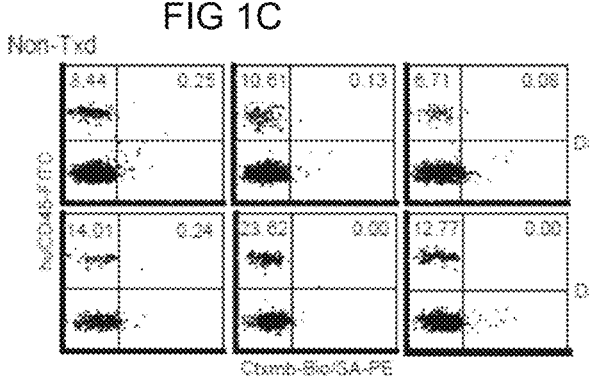
Figure 1C:
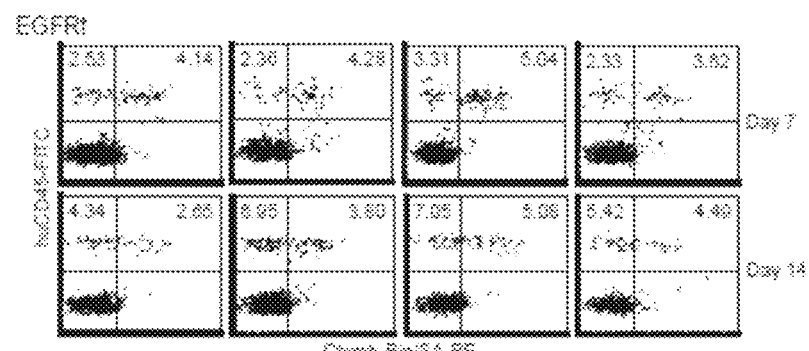
Figure 1C:
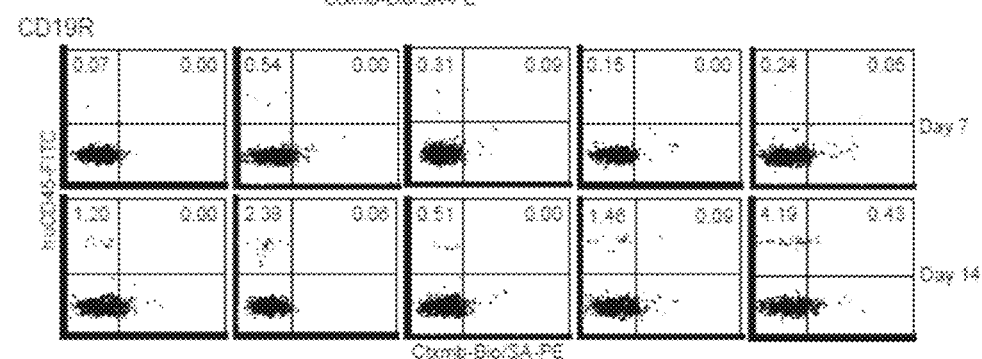

CD19R+ T cells fail to engraft in NSG mice. Central memory T cells ($T_{CM}$) as a T cell subpopulation, have been characterized as having superior engraftment potential, and thus therapeutic efficacy, after adoptive transfer (Wang et al. 2011b). Further evidence has shown that CAR expression on the $T_{CM}$-derived cells seem to correlate with decreased in vivo persistence in an in vivo xenograft model using NSG mice. As the studies described herein indicate, this decrease in persistence was shown in an experiment comparing the engraftment of non-transduced $T_{CM}$-derived cells to (i) $T_{CM}$-derived cells that were lentivirally transduced to express both a CD19-specific CAR (CD19R) and a truncated EGFR (EGFRt) as a tracking marker, and (ii) $T_{CM}$-derived cells that were lentivirally transduced to express just the EGFRt tracking marker on the cell surface (FIGS. 1A-1C). Looking at peripheral blood collected 7 and 14 days after the cells were administered i.v. into mice, staining with anti-human CD45 mAb allowed for detection of non-transduced $T_{CM}$-derived cells (FIG. 1C). However, upon co-staining for the EGFRt tracking marker to detect gene-modified cells, it was apparent that, despite the similar level of transduction and/or EGFRt-expression of the input cells (FIG. 1B, 78-79% positive), there was significantly less engraftment of cells in the peripheral blood of mice that received CD19R/EGFRt+ TCM compared to those that received EGFRt+ TCM (FIG. 1C, p<0.0001 comparing percentages of CD45/EGFRt+ cells in each group at either day 7 or day 14 using unpaired Student's t-tests). Although low levels of T cells were detected for the CD19R/EGFRt+ TCM-treated mice, all of the persistent T cells at day 7 and 14 were CAR-negative. This impaired in vivo persistence is not associated with lentiviral transduction of the T cells, as it is specific to cells transduced to express the CAR transgene and not the EGFRt transgene. Furthermore, the lack of CD19 antigen in these NSG mice, and the fact that a similar phenomenon with T cells expressing CARs of different antigen specificity has been seen (data not shown), suggests that the lack of engraftment/persistence in the peripheral blood is antigen independent.

Figure 2:
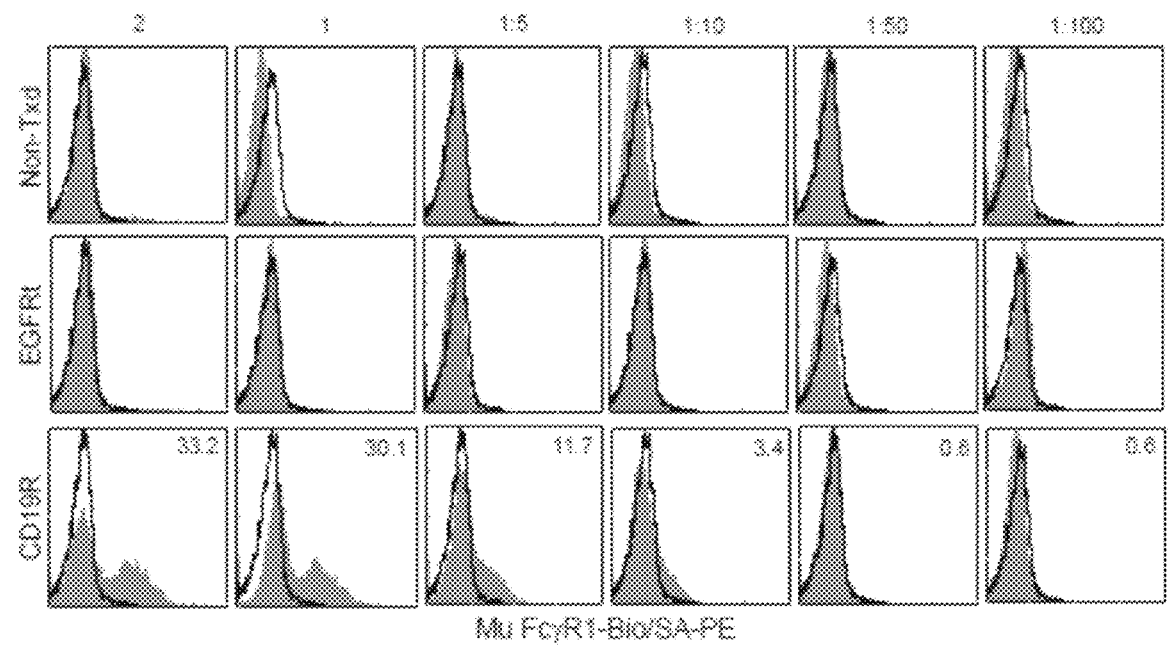
FIG. 2 illustrates that CD19-specific CAR-expressing T cells bind soluble FcγR1 according to one embodiment. The same T cells described in FIGS. 1A-1C were stained with the indicated volume titration of biotinylated soluble human Fc gamma receptor 1 followed by PE-conjugated streptavidin (SA-PE, grey histogram). For CD19R-expressing cells, percentages of immune reactive cells are indicated in each histogram, and based on an M1 gate set to detect ≤1% of that stained with SA-PE alone (black line).
Figure 2:
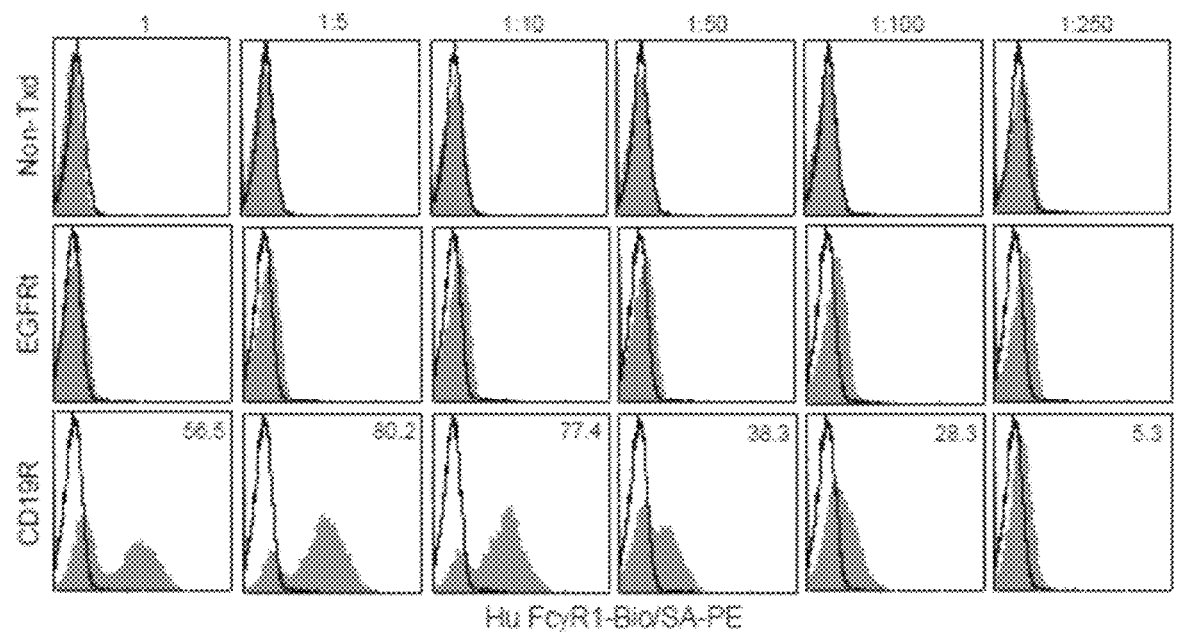

HuFcγR binds CD19R+ T cells. The CD19R construct includes a CD19-specific scFv derived from mouse monoclonal antibody FMC63, a human IgG4 Fc linker, human CD28 transmembrane and cytoplasmic domains, and a human CD3-zeta cytoplasmic domain. Because the CAR construct includes a portion of a human IgG4 Fc region, the propensity of FcR-mediated innate immune responses to selectively clear the CD19R/EGFRt+ cells—but not the EGFRt+ cells—was investigated. Indeed, a binding assay using soluble human FcγR1 revealed that, in contrast to $T_{CM}$-derived cells that were non-transduced or expressed only the EGFRt, those that expressed CD19R exhibited binding of the FcγR1 molecules that could be titrated down with higher dilutions (FIG. 2). Of note, NSG mice, while immunodeficient, are known to still have FcR-expressing neutrophils and monocytes (Ishikawa et al. 2005; Ito et al. 2002), thus providing a potential rationale for the lack of CAR+ T cell persistence observed in prior engraftment studies.

Figure 3A:
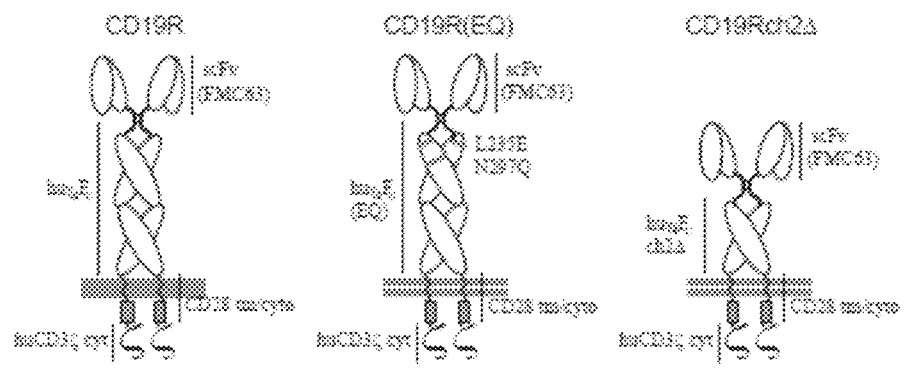
FIGS. 3A-3C show that a mutated IgG4 spacer does not affect CD19-specific effector function of CAR-expressing T cells according to one embodiment.
Figure 3B:
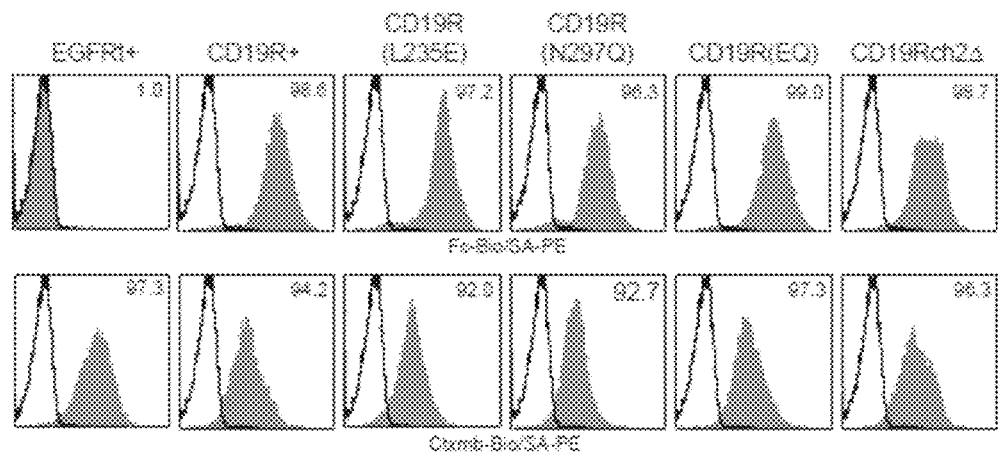
Figure 3C:
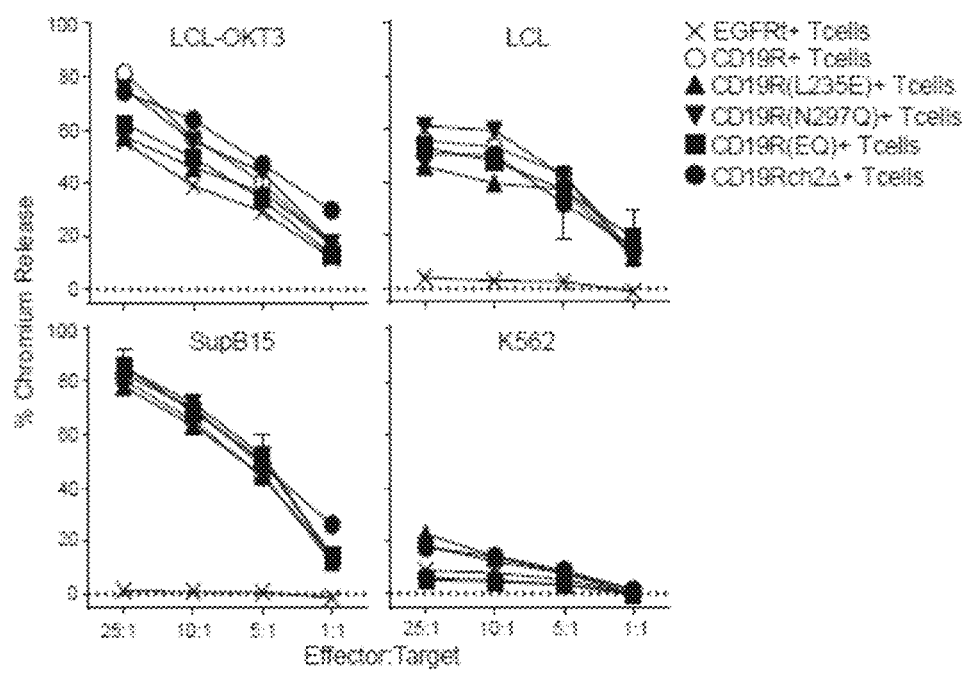
Figure 4:
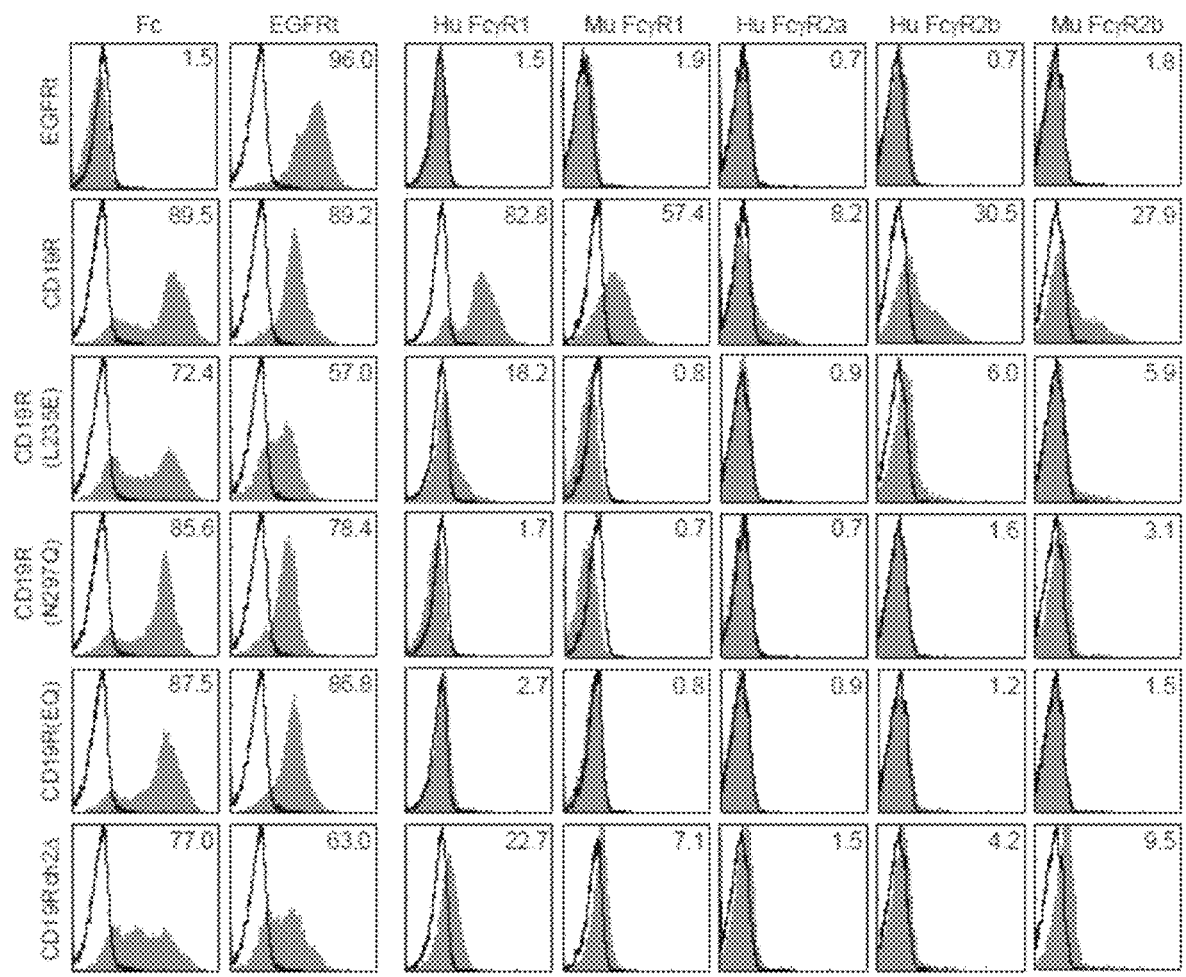
FIG. 4 shows that CARs with a mutated IgG4 spacer exhibit inhibited FcγR binding according to one embodiment. $T_{CM}$-derived, EGFRt-enriched, expanded cell lines expressing either the EGFRt marker alone, the parental CD19R, the single point-mutated CD19R(L235E) or CD19R(N297Q), the double point-mutated CD19R(EQ), or the CH2-deleted CD19Rch2Δ were stained with the following biotinylated reagents: anti-Fc antibody (to detect the CAR), cetuximab (to detect EGFRt), or the indicated human (Hu) or murine (Mu) soluble Fc receptors (FcγR1, R2a, or R2b); followed by PE-conjugated streptavidin (SA-PE, grey histogram). Percentages of immune reactive cells are indicated in each histogram, and based on an M1 gate set to detect ≤1% of that stained with SA-PE alone (black line).

Generation of CD19R mutants. To further test the significance of potential FcR-mediated effects on the CAR-expressing $T_{CM}$ population, the CD19-specific CAR was mutated at amino acids within the IgG4 CH2 domain that may be involved with FcR binding—L235E and/or N297Q (FIG. 3A). A CD19-specific CAR with a deletion of the IgG4 CH2 domain (i.e., a deletion of the domain that contains residues 235 and 297) was also generated (FIG. 3A). The resulting single mutants, CD19R(L235E) and CD19R (N297Q), double mutant CD19R(EQ) (having both L235E and N297Q mutations), and deletion CD19Rch2Δ sequences were incorporated into separate lentiviral constructs, where they were each coordinately expressed with EGFRt from a single transcript, using the T2A ribosome skip sequence in a design similar to that described in FIG. 1A for the non-mutated CD19R. After lentiviral transduction, immunomagnetic enrichment of EGFRt-expressing cells, and a single round of rapid expansion, each of the $T_{CM}$-derived lines were 92-99% positive for the expected transgenes (FIG. 3B), demonstrating that the mutations do not adversely affect CAR expression. Furthermore, none of these mutations altered the CD19 specific cytolytic potential of these $T_{CM}$-derived cells in 4 hour $^{51}$Cr-release assays (FIG. 3C).

huFcγR binding to CARs with mutated IgG4 spacer is impaired. To determine the efficacy of the different mutations/deletion in the CAR to affect FcR binding, flow cytometric analysis was performed using various human and murine biotinylated soluble FcγRs, and PE-streptavidin (SA-PE) to detect the binding of the FcγRs to the different cell populations. T cells that expressed the non-mutated CD19R were bound by human FcγR1, FcγR2a and FcγR2b, as well as murine FcγR1 and FcγR2b (FIG. 4). In contrast, T cells that expressed only EGFRt were not bound by these FcγRs, and T cells that expressed either the CD19R (N297Q), CD19R(L235E) or CD19R(EQ) mutants, or the CD19Rch2Δ deletion all displayed significantly reduced binding to these FcγRs.

Figure 5A:
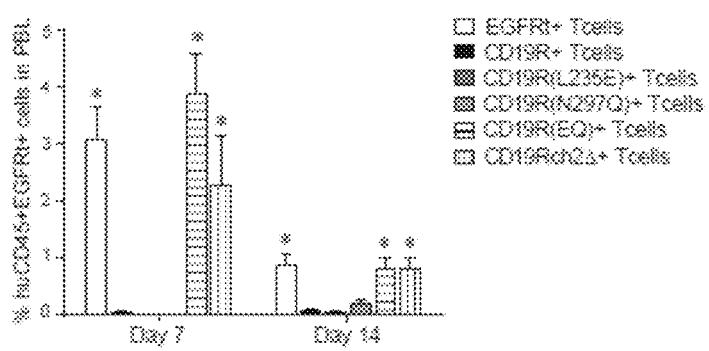
FIGS. 5A-5B show that T cells expressing CARs with mutated IgG4 spacer exhibit enhanced in vivo engraftment according to one embodiment. $10^7$ $T_{CM}$-derived, EGFRt-enriched cells expressing either the parental CD19R, the EGFRt marker alone, the single point-mutated CD19R (L235E) or CD19R(N297Q), the double point-mutated CD19R(EQ), or the CH2-deleted CD19Rch2Δ (see phenotype FIG. 3B) were infused i.v. into NSG mice on day 0 with irradiated NS0-IL15 support. Day 7 and 14 peripheral blood leukocytes harvested from each group (n=5 mice) were stained using PerCP-conjugated anti-human CD45, and biotinylated-cetuximab followed by PE-conjugated streptavidin.
Figure 5B:
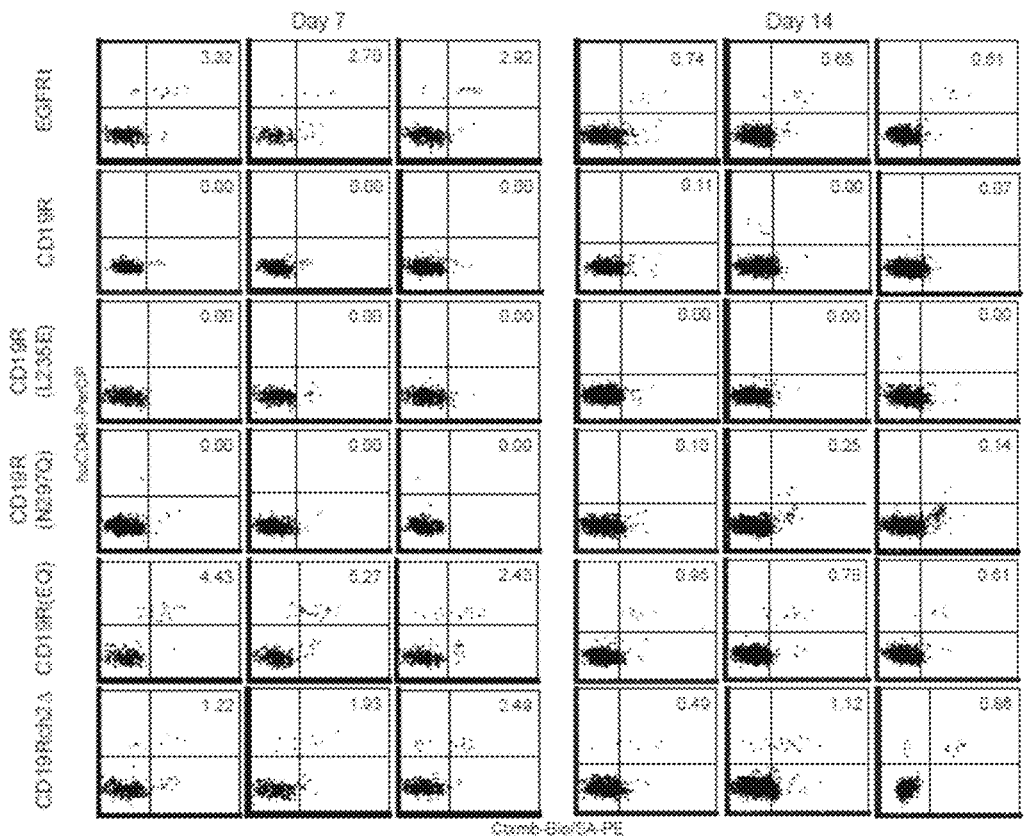
Figure 8A:
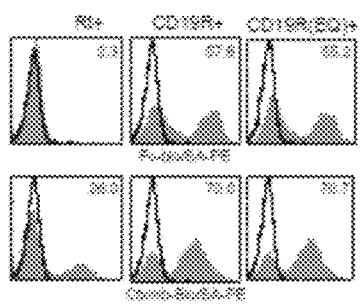
FIGS. 8A-8C show that non-enriched $T_{CM}$-derived cells expressing CARs with mutated IgG4 spacer exhibit enhanced in vivo engraftment according to some embodiments. $10^7$ $T_{CM}$-derived cells expressing either the EGFRt marker alone, the parental CD19R, or the double point-mutated CD19R(EQ) were infused i.v. into NSG mice on day 0 with irradiated NS0-IL15 support. Day 7 and 14 peripheral blood leukocytes harvested from each group (n=4-6 mice) were stained using PerCP-conjugated anti-human CD45, and biotinylated-cetuximab followed by PE-conjugated streptavidin.
Figure 8B:
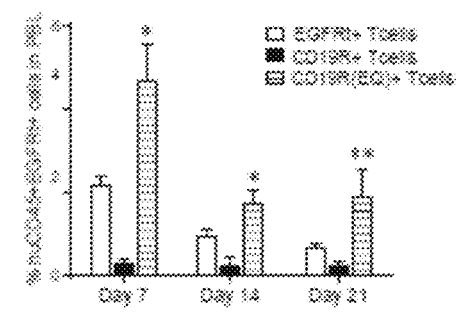
Figure 8C:
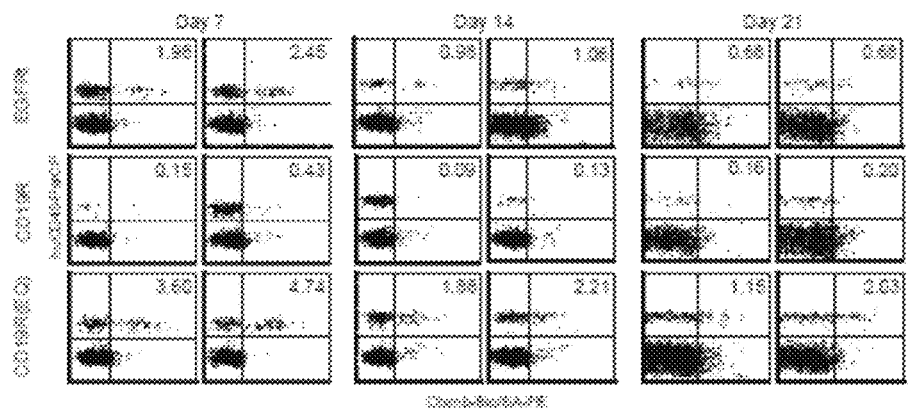

T cells with CD19R mutants exhibit improved in vivo engraftment and persistence. To determine whether the CD19R mutations or deletion which helped prevent FcγR binding would translate to an increased in vivo persistence upon adoptive transfer, $10^7$ T cells expressing either the parental CD19R, the EGFRt marker alone, the CD19R (L235E), the CD19R(N297Q), the CD19R(EQ), or the CD19Rch2Δ were infused i.v. into NSG mice. One and two weeks later, peripheral blood was assayed for CD45$^+$ EGFRt+ cell engraftment (FIGS. 5A-5B). Engrafted EGFRt+ cells could be detected when the T cells expressed the single mutated CD19R(L235E) or CD19R(N297Q). Further, expression of the double point-mutated CD19R (EQ) or CH2-deleted CD19Rch2Δ rescued T cell engraftment, as levels of CD45/EGFRt+ cells observed in these groups of mice were similar to that seen when EGFRt alone was expressed. This rescued engraftment and persistence of gene-modified cells was also observed using TCM-derived cells that were not EGFRt-enriched prior to adoptive transfer (FIGS. 8A-8C).

Figure 6A:
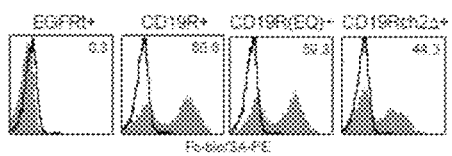
Figure 6B:
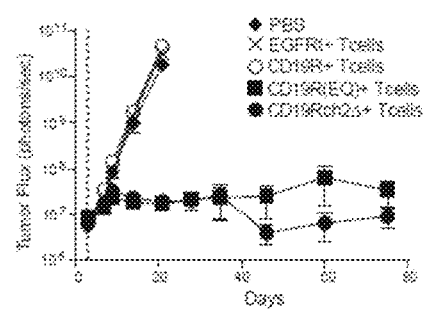
Figure 6C:
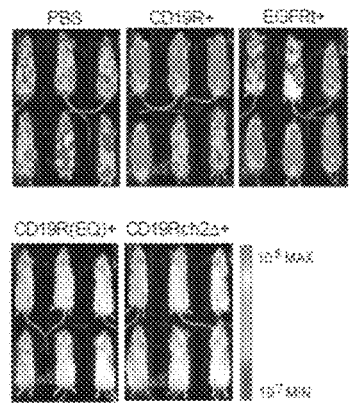
Figure 6D:
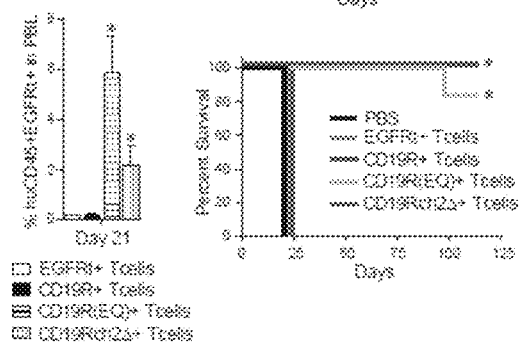

T cells with CD19R mutants exhibit improved therapeutic efficacy. Based on the engraftment findings, the effects of the CD19R(EQ) or CD19Rch2Δ on the anti-tumor efficacy of the $T_{CM}$-derived cells were compared. LCL is a CD19-expressing tumor cell line that was transduced to express firefly luciferase (ffLuc) to allow for bioluminescent monitoring of in vivo tumor growth. Three days after the ffLuc+ LCL were administered to NSG mice i.v., the mice were treated i.v. with either PBS as a control or 5×10$^6$ T cells expressing either the non-mutated CD19R, the EGFRt marker alone, the double point-mutated CD19R(EQ), or the CH2-deleted CD19Rch2Δ. Expression of either the CD19R (EQ) or the CD19Rch2Δ on the $T_{CM}$-derived cells resulted in significant control of tumor growth (FIGS. 6A-6E). This efficacy correlated with the presence/persistence of the gene-modified cells in the peripheral blood at day 21 (FIG. 6D). Indeed, while the PBS, CD19R and EGFRt control groups all had to be euthanized at day 21, all of the mice in the CD19R(EQ) and CD19Rch2Δ groups survived past 100 days (FIG. 6E). While these engraftment and efficacy studies focused on the TCM subset of T cells, these findings suggest that the positive benefit of IgG4-mutations for eliminating FcR interaction are independent of the T cell population that is engineered. Indeed, expression of the CD19R(EQ) in bulk PBMC-derived T cells, instead of TCM-derived lines, also resulted in improved anti-tumor efficacy and long-term survival (p=0.0295) (FIGS. 7A-7D).

DISCUSSION

Clinically, the in vivo therapeutic efficacy of adoptive T cell strategies directly correlates with engraftment and persistence upon adoptive transfer (Heslop et al. 2003; Brenner & Heslop 2010). Various approaches have been suggested to improve transferred T cell persistence, including lymphodepletion of the host prior to cell transfer (Gattinoni et al. 2005), cytokine support after cell transfer (most recently reviewed in (Overwijk & Schluns 2009), and use of the optimal T cell population(s) for transfer (Berger et al. 2008; Hinrichs et al. 2011; Yang et al. 2013; Gattinoni et al. 2011; Cieri et al. 2013). The studies described above provide further evidence that chimeric antigen receptor (CAR) design plays a significant role in directing the engraftment and persistence of therapeutic cells. Previously, CAR design has been exploited to benefit engraftment and persistence of therapeutic cells is by including costimulatory signaling domains in second and third generation CARs (see Cartellieri et al. 2010). However, as the data above also suggests, sequences that are used to connect the ligand-binding domain to the signaling domain(s) of the CAR (known as either the spacer, hinge and/or linker) are of previously unappreciated importance for in vivo therapeutic outcome in murine models of malignant disease. Specifically, it was found that the use of an Ig Fc spacer can potentially inhibit the engraftment and/or persistence of CAR-expressing cells in NSG mouse models in a manner that correlates with FcγR binding. Prevention of FcγR binding by either point mutation or deletion of the relevant sequences within the CAR Fc domain can then restore the in vivo persistence of the adoptively transferred cells to that of cells which do not express a CAR. The increased in vivo persistence that is mediated by the spacer-optimized CAR then translates, into significantly improved CAR-directed anti-tumor therapy in an in vivo mouse model.

The immunological clearance of adoptively transferred T cells is not a new issue. For example, cellular immune rejection responses against the HyTK and NeoR selection genes have been shown to be coordinately expressed with the CAR (Berger et al. 2006; Jensen et al. 2010). However, the studies described above highlights the importance of FcR-mediated responses against CAR-expressing T cells for in vivo T cell persistence and anti-tumor efficacy. Consequently, the studies also show that there is a 'fix' to avoid this form of immunogenicity—namely, the incorporation of mutations in the CAR design to prevent FcγR-recognition.

Based on these results, the mutations described herein may be extrapolated to humans and should therefore augment the persistence and therapeutic efficacy of T cells expressing IgG-spacer containing CAR in humans. Any discrepancy in CAR T cell engraftment and in vivo anti-tumor efficacy is likely impacted by the nature of the murine NSG model system. Human IgG4 has been shown to efficiently bind murine FcRs to mediate potent antibody dependent cell-mediated cytotoxicity (Isaacs et al. Steplewski et al. 1988). In contrast, human FcRs have the strongest affinity toward IgG1 and IgG3, and reduced affinity for IgG4 (Schroeder & Cavacini 2010; Nirula et al. 2011). Additionally, given that NSG mice lack serum antibodies, FcRs expressed by their innate immune cells are unoccupied and thus have a greater potential to bind the IgG-Fc spacer within the CAR. With the exception of hypoglobulinemia cases, immunocompetent humans have high serum IgG levels of approximately 10 mg/mL (Stoop et al, 1969), which could potentially compete for recognition of IgG-containing CARs. Indeed, several groups have administered IgG-Fc bearing CAR T cells to humans, and in some cases low levels of CAR T cells were detectible by quantitative PCR up to 6 weeks (Savoldo et al. 2011) and even one year (Till et al. 2012) after administration. Incorporation of the mutations described herein would likely further improve this CAR T cell persistence in humans.

Overall, the studies reported here provide evidence that CARs containing components of an Ig Fc spacer should incorporate modifications that prevent the FcR-mediated recognition of the cells in vivo. Such modifications can involve either point mutations to change the amino acid sequence, or sequence deletions such as that seen with the CD19R(EQ) and CD19Rch2Δ constructs described herein. Not only will such modifications prevent the ability of FcR-expressing cells to recognize the CAR-expressing immunotherapeutic cellular product in vivo, but they might also prevent the unintentional activation of the transferred T cells and/or the host immune responses (Hombach et al. 2010), which could contribute to various unwanted side-effects of this immunotherapeutic strategy.

REFERENCES

The references, patents and published patent applications listed below, and all references cited in the specification above are hereby incorporated by reference in their entirety, as if fully set forth herein.

Berger, C, Jensen, M C, Lansdorp, P M, Gough, M, Elliott, C, and Riddell, S R (2008). Adoptive transfer of effector CD8 T cells derived from central memory cells establishes persistent T cell memory in primates. J Clin Invest 118: 294-305.

Berger, C, Flowers, M E, Warren, E H, and Riddell, S R (2006). Analysis of transgene-specific immune responses that limit the in vivo persistence of adoptively transferred HSV-T K-modified donor T cells after allogeneic hematopoietic cell transplantation. Blood 107: 2294-2302.

Brenner, M K, and Heslop, H E (2010). Adoptive T cell therapy of cancer. Curr Opin Immunol 22: 251-257.

Brentjens, R J, Santos, E, Nikhamin, Y, Yeh, R, Matsushita, M, La Perle, K, et al. (2007). Genetically targeted T cells eradicate systemic acute lymphoblastic leukemia xenografts. Clin Cancer Res 13: 5426-5435.

Brentjens R J, Davila M L, Riviere I, Park J, Wang X, Cowell L G, Bartido S, Stefanski J, Taylor C, Olszewska M, Borquez-Ojeda O, Qu J, Wasielewska T, He Q, Bernal Y, Rijo I V, Hedvat C, Kobos R, Curran K, Steinherz P, Jurcic J, Rosenblat T, Maslak P, Frattini M, Sadelain M. (2013) CD19-targeted T cells rapidly induce molecular remissions in adults with chemotherapy-refractory acute lymphoblastic leukemia. Sci Transl Med. 5(177):177

Brentjens R J, Rivière I, Park J H, Davila M L, Wang X, Stefanski J, Taylor C, Yeh R, Bartido S, Borquez-Ojeda O, Olszewska M, Bernal Y, Pegram H, Przybylowski M, Hollyman D, Usachenko Y, Pirraglia D, Hosey J, Santos E, Halton E, Maslak P, Scheinberg D, Jurcic J, Heaney M, Heller G, Frattini M, Sadelain M. (2012) Safety and persistence of adoptively transferred autologous CD19-targeted T cells in patients with relapsed or chemotherapy refractory B-cell leukemias. Blood. 118(18):4817-28.

Cartellieri, M, Bachmann, M, Feldmann, A, Bippes, C, Stamova, S, Wehner, R, et al. (2010). Chimeric antigen receptor-engineered T cells for immunotherapy of cancer. J Biomed Biotechnol 2010: 956304.

Cieri, N, Camisa, B, Cocchiarella, F, Forcato, M, Oliveira, G, Provasi, E, et al. (2013). IL-7 and IL-15 instruct the generation of human memory stem T cells from naive precursors. Blood 121: 573-584.

De Oliveira, S N, Ryan, C, Giannoni, F, Hardee, C L, Tremcinska, I, Katebian, B, et al. (2013). Modification of Hematopoietic Stem/Progenitor Cells with CD19-18 Specific Chimeric Antigen Receptors as a Novel Approach for Cancer Immunotherapy. Hum Gene Ther 24: 824-839.

Gattinoni, L, Finkelstein, S E, Klebanoff, C A, Antony, P A, Palmer, D C, Spiess, P J, et al. (2005). Removal of homeostatic cytokine sinks by lymphodepletion enhances the efficacy of adoptively transferred tumor-specific CD8+ T cells. J Exp Med 202: 907-912.

Gattinoni, L, Lugli, E, Ji, Y, Pos, Z, Paulos, C M, Quigley, M F, et al. (2011). A human memory T cell subset with stem cell-like properties. Nat Med 17: 1290-1297.

Grupp S. A., Kalos M., Barrett D., Aplenc R., Porter D. L., Rheingold S. R., et al. (2013). Chimeric antigen receptor-modified T cells for acute lymphoid leukemia. N. Engl. J. Med. 368, 1509-1518.

Guest, R D, Hawkins, R E, Kirillova, N, Cheadle, E J, Arnold, J, O'Neill, A, et al. (2005). The role of extracellular spacer regions in the optimal design of chimeric immune receptors: evaluation of four different scFvs and antigens. J Immunother 28: 203-211.

Haso, W, Lee, D W, Shah, N N, Stetler-Stevenson, M, Yuan, C M, Pastan, I H, et al. (2013). Anti-CD22-chimeric antigen receptors targeting B-cell precursor acute lymphoblastic leukemia. Blood 121: 1165-1174.

Heslop, H E, Stevenson, F K, and Molldrem, J J (2003). Immunotherapy of hematologic malignancy. Hematology Am Soc Hematol Educ Program: 331-349.

Hinrichs, C S, Borman, Z A, Gattinoni, L, Yu, Z, Burns, W R, Huang, J, et al. (2011). Human effector CD8+ T cells derived from naive rather than memory subsets possess superior traits for adoptive immunotherapy. Blood 117: 808-814.

Hombach, A, Wieczarkowiecz, A, Marquardt, T, Heuser, C, Usai, L, Pohl, C, et al. (2001). Tumor-specific T cell activation by recombinant immunoreceptors: CD3 zeta signaling and CD28 costimulation are simultaneously required for efficient IL-2 secretion and can be integrated into one combined CD28/CD3 zeta signaling receptor molecule. J Immunol 167: 6123-6131.

Hombach, A, Hombach, A A, and Abken, H (2010). Adoptive immunotherapy with genetically engineered T cells: modification of the IgG1 Fc 'spacer' domain in the extracellular moiety of chimeric antigen receptors avoids 'off-target' activation and unintended initiation of an innate immune response. Gene Ther 17:1206-1213.

Huang, G, Yu, L, Cooper, L J, Hollomon, M, Huls, H, and Kleinerman, E S (2012). Genetically modified T cells targeting interleukin-11 receptor alpha-chain kill human osteosarcoma cells and induce the regression of established osteosarcoma lung metastases. Cancer Res 72: 271-281.

Hudecek, M, Lupo-Stanghellini, M T, Kosasih, P L, Sommermeyer, D, Jensen, M C, Rader, C, et al. (2013). Receptor affinity and extracellular domain modifications affect tumor recognition by ROR1-specific chimeric antigen receptor T cells. Clin Cancer Res 19: 3153-3164.

Hudecek, M, Schmitt, T M, Baskar, S, Lupo-Stanghellini, M T, Nishida, T, Yamamoto, T N, et al. (2010). The B-cell tumor-associated antigen ROR1 can be targeted with T cells modified to express a ROR1-specific chimeric antigen receptor. Blood 116: 4532-4541.

Imai, C, Mihara, K, Andreansky, M, Nicholson, I C, Pui, C H, Geiger, T L, et al. (2004). Chimeric receptors with 4-1BB signaling capacity provoke potent cytotoxicity against acute lymphoblastic leukemia. Leukemia 18: 676-684.

Isaacs, J D, Greenwood, J, and Waldmann, H (1998). Therapy with monoclonal antibodies. II. The contribution of Fc gamma receptor binding and the influence of C(H)1 and C(H)3 domains on in vivo effector function. J Immunol 161: 3862-3869.

Ishikawa, F, Yasukawa, M, Lyons, B, Yoshida, S, Miyamoto, T, Yoshimoto, G, et al. (2005). Development of functional human blood and immune systems in NOD/SCID/IL2 receptor {gamma} chain(null) mice. Blood 106: 1565-1573.

Ito, M, Hiramatsu, H, Kobayashi, K, Suzue, K, Kawahata, M, Hioki, K, et al. (2002). NOD/SCID/gamma(c)(null) mouse: an excellent recipient mouse model for engraftment of human cells. Blood 100: 3175-3182.

Jensen, M C, Popplewell, L, Cooper, L J, DiGiusto, D, Kalos, M, Ostberg, J R, et al. (2010). Antitransgene rejection responses contribute to attenuated persistence of adoptively transferred CD20/CD19-specific chimeric antigen receptor redirected T cells in humans. Biol Blood Marrow Transplant 16: 1245-1256.

Jonnalagadda, M, Brown, C E, Chang, W C, Ostberg, J R, Forman, S J, and Jensen, M C (2013). Engineering human T cells for resistance to methotrexate and mycophenolate mofetil as an in vivo cell selection strategy. PLoS One 8: e65519.

Kahlon, K S, Brown, C, Cooper, L J, Raubitschek, A, Forman, S J, and Jensen, M C (2004). Specific recognition and killing of glioblastoma multiforme by interleukin 13-zetakine redirected cytolytic T cells. Cancer Res 64: 9160-9166.

Kalos, M, Levine, B L, Porter, D L, Katz, S, Grupp, S A, Bagg, A, et al. (2011). T cells with chimeric antigen receptors have potent antitumor effects and can establish memory in patients with advanced leukemia. Sci Transl Med 3: 95ra73.

Kebriaei, P, Huls, H, Jena, B, Munsell, M, Jackson, R, Lee, D A, et al. (2012). Infusing CD19-directed T cells to augment disease control in patients undergoing autologous hematopoietic stem-cell transplantation for advanced B-lymphoid malignancies. Hum Gene Ther 23: 444-450.

Kochenderfer, J N, Feldman, S A, Zhao, Y, Xu, H, Black, M A, Morgan, R A, et al. (2009). Construction and preclinical evaluation of an anti-CD19 chimeric antigen receptor. J Immunother 32: 689-702.

Kochenderfer J N, Dudley M E, Feldman S A, Wilson W H, Spaner D E, Maric I, Stetler-Stevenson M, Phan G Q, Hughes M S, Sherry R M, Yang J C, Kammula U S, Devillier L, Carpenter R, Nathan D A, Morgan R A, Laurencot C, Rosenberg S A. (2012). B-cell depletion and remissions of malignancy along with cytokine-associated toxicity in a clinical trial of anti-CD19 chimeric-antigen-receptor-transduced T cells. Blood. 119(12):2709-20.

Kowolik, C M, Topp, M S, Gonzalez, S, Pfeiffer, T, Olivares, S, Gonzalez, N, et al. (2006). CD28 costimulation provided through a CD19-specific chimeric antigen receptor enhances in vivo persistence and antitumor efficacy of adoptively transferred T cells. Cancer Res 66: 10995-11004.

Mardiros, A, Dos Santos, C, McDonald, T, Brown, C E, Wang, X, Budde, L E, et al. (2013). T cells expressing CD123-specific chimeric antigen receptors exhibit specific cytolytic effector functions and anti-tumor effects against human acute myeloid leukemia. Blood.

Milone, M C, Fish, J D, Carpenito, C, Carroll, R G, Binder, G K, Teachey, D, et al. (2009). Chimeric receptors containing CD137 signal transduction domains mediate enhanced survival of T cells and increased antileukemic efficacy in vivo. Mol Ther 17: 1453-1464.

Nguyen, P, Moisini, I, and Geiger, T L (2003). Identification of a murine CD28 dileucine motif that suppresses single-chain chimeric T-cell receptor expression and function. Blood 102: 4320-4325.

Nirula, A, Glaser, S M, Kalled, S L, and Taylor, F R (2011). What is IgG4? A review of the biology of a unique immunoglobulin subtype. Curr Opin Rheumatol 23: 119-124.

Overwijk, W W, and Schluns, K S (2009). Functions of gammaC cytokines in immune homeostasis: current and potential clinical applications. Clin Immunol 132: 153-165.

Reddy, M P, Kinney, C A, Chaikin, M A, Payne, A, Fishman-Lobell, J, Tsui, P, et al. (2000). Elimination of Fc receptor-dependent effector functions of a modified IgG4 monoclonal antibody to human CD4. J Immunol 164: 1925-1933.

Savoldo, B, Ramos, C A, Liu, E, Mims, M P, Keating, M J, Carrum, G, et al. (2011). CD28 costimulation improves expansion and persistence of chimeric antigen receptor-modified T cells in lymphoma patients. J Clin Invest 121: 1822-1826.

Sazinsky, S L, Ott, R G, Silver, N W, Tidor, B, Ravetch, J V, and Wittrup, K D (2008). Aglycosylated immunoglobulin G1 variants productively engage activating Fc receptors. Proc Natl Acad Sci USA 105: 20167-20172.

Schroeder, H W, Jr., and Cavacini, L (2010). Structure and function of immunoglobulins. J Allergy Clin Immunol 125: S41-52.

Stastny, M J, Brown, C E, Ruel, C, and Jensen, M C (2007). Medulloblastomas expressing IL13Ralpha2 are targets for IL13-zetakine+ cytolytic T cells. J Pediatr Hematol Oncol 29: 669-677.

Steplewski, Z, Sun, L K, Shearman, C W, Ghrayeb, J, Daddona, P, and Koprowski, H (1988). Biological activity of human-mouse IgG1, IgG2, IgG3, and IgG4 chimeric monoclonal antibodies with antitumor specificity. Proc Natl Acad Sci USA 85: 4852-4856.

Stoop, J W, Zegers, B J, Sander, P C, and Ballieux, R E (1969). Serum immunoglobulin levels in healthy children and adults. Clin Exp Immunol 4: 101-112.

Strohl, W R (2009). Optimization of Fc-mediated effector functions of monoclonal antibodies. Curr Opin Biotechnol 20: 685-691.

Szymczak, A L, Workman, C J, Wang, Y, Vignali, K M, Dilioglou, S, Vanin, E F, et al. (2004). Correction of multi-gene deficiency in vivo using a single 'selfcleaving' 2A peptide-based retroviral vector. Nat Biotechnol 22: 589-594.

Till, B G, Jensen, M C, Wang, J, Qian, X, Gopal, A K, Maloney, D G, et al. (2012). CD20-specific adoptive immunotherapy for lymphoma using a chimeric antigen receptor with both CD28 and 4-1BB domains: pilot clinical trial results. Blood 119: 3940-3950.

Wang, X, Naranjo, A, Brown, C E, Bautista, C, Wong, C W, Chang, W C, et al. (2012). Phenotypic and Functional Attributes of Lentivirus-modified CD19-specific Human CD8+ Central Memory T Cells Manufactured at Clinical Scale. J Immunother 35: 689-701.

Wang, X, Chang, W C, Wong, C W, Colcher, D, Sherman, M, Ostberg, J R, et al. (2011a). A transgene-encoded cell surface polypeptide for selection, in vivo tracking, and ablation of engineered cells. Blood 118: 1255-1263.

Wang, X, Berger, C, Wong, C W, Forman, S J, Riddell, S R, and Jensen, M C (2011b). Engraftment of human central memory-derived effector CD8+ T cells in immunodeficient mice. Blood 117: 1888-1898.

Wilkie, S, Picco, G, Foster, J, Davies, D M, Julien, S, Cooper, L, et al. (2008). Retargeting of human T cells to tumor-associated MUC1: the evolution of a chimeric antigen receptor. J Immunol 180: 4901-4909.

Yang, S, Ji, Y, Gattinoni, L, Zhang, L, Yu, Z, Restifo, N P, et al. (2013). Modulating the differentiation status of ex vivo-cultured anti-tumor T cells using cytokine cocktails. Cancer Immunol Immunother 62: 727-736.

Zhong, X S, Matsushita, M, Plotkin, J, Riviere, I, and Sadelain, M (2010). Chimeric antigen receptors combining 4-1BB and CD28 signaling domains augment PI3kinase/AKT/Bcl-XL activation and CD8+ T cell-mediated tumor eradication. Mol Ther 18: 413-420.

---

What is claimed is:

1. A recombinant chimeric antigen receptor (CAR) comprising:
   an antigen recognition domain that targets a cancer associated antigen selected from the group consisting of CD19, CD20, CD123, HER2, IL-13 receptor α2, prostate stem cell antigen (PSCA), prostate-specific membrane antigen (PSMA), and tumor-associated glycoprotein-72 (TAG-72);
   a spacer domain comprising the amino acid sequence ESKYGPPCPPCPAPE-FEGGPSVFLFPPKPKDTLMISRTPE-VTCVVVDVSQEDPEVQFNWYVDGVEVHNAKTKPRE-EQFQSTYRVVSVLTVLHQDWLNGKEYKCKVSN KGLPSSIEKTISKAKGQPREPQVYTLPP-SQEEMTKN QVSLTCLVKGFYPSDIA-VEWESNGQPENNYKTTPPVLDSDGSFFLY-SRLTVDKSRWQEGNVFSCSVMHEA LHNHYTQKSLSLSLGK (SEQ ID NO: 19);
   a transmembrane domain;
   a co-stimulatory intracellular signaling domain selected from the group consisting of: CD28, ICOS, OX40, CD27, DAP10, 4-1BB, p56lck, and 2B4; and
   a T cell receptor (TCR) zeta chain signaling domain.

2. The chimeric antigen receptor of claim 1, wherein the co-stimulatory intracellular signaling domain is 4-1BB.

3. The chimeric antigen receptor of claim 1, wherein the co-stimulatory intracellular signaling domain is CD28.

4. The chimeric antigen receptor of claim 1, wherein the antigen recognition domain targets IL-13 receptor α2.

5. The chimeric antigen receptor of claim 1, wherein the antigen recognition domain is an scFv.

6. The chimeric antigen receptor of claim 5, wherein the antigen recognition domain is an scFv that targets CD19 and comprises a light chain variable domain comprising the amino acid sequence of SEQ ID NO:1 and a heavy chain variable domain comprising the amino acid sequence of SEQ ID NO: 2.

\* \* \* \* \*

SEQUENCE LISTING

```
<160> NUMBER OF SEQ ID NOS: 27

<210> SEQ ID NO 1
<211> LENGTH: 107
<212> TYPE: PRT
<213> ORGANISM: Artificial Sequence
<220> FEATURE:
<223> OTHER INFORMATION: CD19 receptor variable light chain antigen
      binding domain

<400> SEQUENCE: 1

Asp Ile Gln Met Thr Gln Thr Thr Ser Ser Leu Ser Ala Ser Leu Gly
1               5                   10                  15

Asp Arg Val Thr Ile Ser Cys Arg Ala Ser Gln Asp Ile Ser Lys Tyr
                20                  25                  30

Leu Asn Trp Tyr Gln Gln Lys Pro Asp Gly Thr Val Lys Leu Leu Ile
            35                  40                  45

Tyr His Thr Ser Arg Leu His Ser Gly Val Pro Ser Arg Phe Ser Gly
        50                  55                  60

Ser Gly Ser Gly Thr Asp Tyr Ser Leu Thr Ile Ser Asn Leu Glu Gln
65                  70                  75                  80

Glu Asp Ile Ala Thr Tyr Phe Cys Gln Gln Gly Asn Thr Leu Pro Tyr
                85                  90                  95

Thr Phe Gly Gly Gly Thr Lys Leu Glu Ile Thr
                100                 105

<210> SEQ ID NO 2
<211> LENGTH: 120
<212> TYPE: PRT
<213> ORGANISM: Artificial Sequence
<220> FEATURE:
<223> OTHER INFORMATION: CD19 receptor variable heavy chain antigen
      binding domain

<400> SEQUENCE: 2

Glu Val Lys Leu Gln Glu Ser Gly Pro Gly Leu Val Ala Pro Ser Gln
1               5                   10                  15

Ser Leu Ser Val Thr Cys Thr Val Ser Gly Val Ser Leu Pro Asp Tyr
                20                  25                  30

Gly Val Ser Trp Ile Arg Gln Pro Pro Arg Lys Gly Leu Glu Trp Leu
            35                  40                  45

Gly Val Ile Trp Gly Ser Glu Thr Thr Tyr Tyr Asn Ser Ala Leu Lys
        50                  55                  60

Ser Arg Leu Thr Ile Ile Lys Asp Asn Ser Lys Ser Gln Val Phe Leu
65                  70                  75                  80

Lys Met Asn Ser Leu Gln Thr Asp Asp Thr Ala Ile Tyr Tyr Cys Ala
                85                  90                  95
```

-continued

Lys His Tyr Tyr Tyr Gly Gly Ser Tyr Ala Met Asp Tyr Trp Gly Gln
            100                 105                 110

Gly Thr Ser Val Thr Val Ser Ser
        115                 120

<210> SEQ ID NO 3
<211> LENGTH: 118
<212> TYPE: PRT
<213> ORGANISM: Artificial Sequence
<220> FEATURE:
<223> OTHER INFORMATION: CD123 variable heavy chain antigen binding
      domain

<400> SEQUENCE: 3

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Ile Phe Thr Asn Tyr
            20                  25                  30

Gly Met Asn Trp Val Lys Gln Ala Pro Gly Lys Ser Phe Lys Trp Met
        35                  40                  45

Gly Trp Ile Asn Thr Tyr Thr Gly Glu Ser Thr Tyr Ser Ala Asp Phe
    50                  55                  60

Lys Gly Arg Phe Ala Phe Ser Leu Glu Thr Ser Ala Ser Thr Ala Tyr
65                  70                  75                  80

Leu His Ile Asn Asp Leu Lys Asn Glu Asp Thr Ala Thr Tyr Phe Cys
                85                  90                  95

Ala Arg Ser Gly Gly Tyr Asp Pro Met Asp Tyr Trp Gly Gln Gly Thr
            100                 105                 110

Ser Val Thr Val Ser Ser
        115

<210> SEQ ID NO 4
<211> LENGTH: 115
<212> TYPE: PRT
<213> ORGANISM: Artificial Sequence
<220> FEATURE:
<223> OTHER INFORMATION: CD123 variable heavy chain antigen binding
      domain

<400> SEQUENCE: 4

Gln Val Gln Leu Gln Gln Pro Gly Ala Glu Leu Val Arg Pro Gly Ala
1               5                   10                  15

Ser Val Lys Leu Ser Cys Lys Ala Ser Gly Tyr Thr Phe Thr Ser Tyr
            20                  25                  30

Trp Met Asn Trp Val Lys Gln Arg Pro Asp Gln Gly Leu Glu Trp Ile
        35                  40                  45

Gly Arg Ile Asp Pro Tyr Asp Ser Glu Thr His Tyr Asn Gln Lys Phe
    50                  55                  60

Lys Asp Lys Ala Ile Leu Thr Val Asp Lys Ser Ser Ser Thr Ala Tyr
65                  70                  75                  80

Met Gln Leu Ser Ser Leu Thr Ser Glu Asp Ser Ala Val Tyr Tyr Cys
                85                  90                  95

Ala Arg Gly Asn Trp Asp Asp Tyr Trp Gly Gln Gly Thr Thr Leu Thr
            100                 105                 110

Val Ser Ser
        115

<210> SEQ ID NO 5

<211> LENGTH: 111
<212> TYPE: PRT
<213> ORGANISM: Artificial Sequence
<220> FEATURE:
<223> OTHER INFORMATION: CD123 variable light chain antigen binding
      domain

<400> SEQUENCE: 5

Asp Ile Val Leu Thr Gln Ser Pro Ala Ser Leu Ala Val Ser Leu Gly
1               5                   10                  15

Gln Arg Ala Thr Ile Ser Cys Arg Ala Ser Glu Ser Val Asp Asn Tyr
            20                  25                  30

Gly Asn Thr Phe Met His Trp Tyr Gln Gln Lys Pro Gly Gln Pro Pro
        35                  40                  45

Lys Leu Leu Ile Tyr Arg Ala Ser Asn Leu Glu Ser Gly Ile Pro Ala
    50                  55                  60

Arg Phe Ser Gly Ser Gly Ser Arg Thr Asp Phe Thr Leu Thr Ile Asn
65                  70                  75                  80

Pro Val Glu Ala Asp Asp Val Ala Thr Tyr Tyr Cys Gln Gln Ser Asn
                85                  90                  95

Glu Asp Pro Pro Thr Phe Gly Ala Gly Thr Lys Leu Glu Leu Lys
            100                 105                 110

<210> SEQ ID NO 6
<211> LENGTH: 107
<212> TYPE: PRT
<213> ORGANISM: Artificial Sequence
<220> FEATURE:
<223> OTHER INFORMATION: CD123 variable light chain antigen binding
      domain

<400> SEQUENCE: 6

Asp Val Gln Ile Thr Gln Ser Pro Ser Tyr Leu Ala Ala Ser Pro Gly
1               5                   10                  15

Glu Thr Ile Thr Ile Asn Cys Arg Ala Ser Lys Ser Ile Ser Lys Asp
            20                  25                  30

Leu Ala Trp Tyr Gln Glu Lys Pro Gly Lys Thr Asn Lys Leu Leu Ile
        35                  40                  45

Tyr Ser Gly Ser Thr Leu Gln Ser Gly Ile Pro Ser Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Met Tyr Tyr Cys Gln Gln His Asn Lys Tyr Pro Tyr
                85                  90                  95

Thr Phe Gly Gly Gly Thr Lys Leu Glu Ile Lys
            100                 105

<210> SEQ ID NO 7
<211> LENGTH: 217
<212> TYPE: PRT
<213> ORGANISM: Artificial Sequence
<220> FEATURE:
<223> OTHER INFORMATION: unmodified IgG1 CH1-CH2 region

<400> SEQUENCE: 7

Ala Pro Glu Leu Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser His Glu Asp Pro Glu Val Lys Phe Asn Trp Tyr

```
                 35                  40                  45
Val Asp Gly Val Glu Val His Asn Ala Lys Thr Lys Pro Arg Glu Glu
 50                  55                  60

Gln Tyr Asn Ser Thr Tyr Arg Val Val Ser Val Leu Thr Val Leu His
 65                  70                  75                  80

Gln Asp Trp Leu Asn Gly Lys Glu Tyr Lys Cys Lys Val Ser Asn Lys
                 85                  90                  95

Ala Leu Pro Ala Pro Ile Glu Lys Thr Ile Ser Lys Ala Lys Gly Gln
                100                 105                 110

Pro Arg Glu Pro Gln Val Tyr Thr Leu Pro Pro Ser Arg Ile Ser Lys
            115                 120                 125

Ala Lys Asn Gln Val Ser Leu Thr Cys Leu Val Lys Gly Phe Tyr Pro
130                 135                 140

Ser Asp Ile Ala Val Glu Trp Glu Ser Asn Gly Gln Pro Glu Asn Asn
145                 150                 155                 160

Tyr Lys Thr Thr Pro Pro Val Leu Asp Ser Asp Gly Ser Phe Phe Leu
                165                 170                 175

Tyr Ser Lys Leu Thr Val Asp Lys Ser Arg Trp Gln Gln Gly Asn Val
            180                 185                 190

Phe Ser Cys Ser Val Met His Glu Ala Leu His Asn His Tyr Thr Gln
        195                 200                 205

Lys Ser Leu Ser Leu Ser Pro Gly Lys
210                 215

<210> SEQ ID NO 8
<211> LENGTH: 216
<212> TYPE: PRT
<213> ORGANISM: Artificial Sequence
<220> FEATURE:
<223> OTHER INFORMATION: unmodified IgG1 CH1-CH2 region

<400> SEQUENCE: 8

Ala Pro Pro Val Ala Gly Pro Ser Val Phe Leu Phe Pro Pro Lys Pro
 1                5                  10                  15

Lys Asp Thr Leu Met Ile Ser Arg Thr Pro Glu Val Thr Cys Val Val
                 20                  25                  30

Val Asp Val Ser His Glu Asp Pro Glu Val Gln Phe Asn Trp Tyr Val
             35                  40                  45

Asp Gly Val Glu Val His Asn Ala Lys Thr Lys Pro Arg Glu Glu Gln
 50                  55                  60

Phe Asn Ser Thr Phe Arg Val Val Ser Val Leu Thr Val Val His Gln
 65                  70                  75                  80

Asp Trp Leu Asn Gly Lys Glu Tyr Lys Cys Lys Val Ser Asn Lys Gly
                 85                  90                  95

Leu Pro Ala Pro Ile Glu Lys Thr Ile Ser Lys Thr Lys Gly Gln Pro
                100                 105                 110

Arg Glu Pro Gln Val Tyr Thr Leu Pro Pro Ser Arg Glu Glu Met Thr
            115                 120                 125

Lys Asn Gln Val Ser Leu Thr Cys Leu Val Lys Gly Phe Tyr Pro Ser
130                 135                 140

Asp Ile Ser Val Glu Trp Glu Ser Asn Gly Gln Pro Glu Asn Asn Tyr
145                 150                 155                 160

Lys Thr Thr Pro Pro Met Leu Asp Lys Asp Gly Ser Phe Phe Leu Tyr
                165                 170                 175

Ser Lys Leu Thr Val Asp Lys Ser Arg Trp Gln Gln Gly Asn Val Phe
```

```
                      180                 185                 190
Ser Cys Ser Val Met His Glu Ala Leu His Asn His Tyr Thr Gln Lys
            195                 200                 205

Ser Leu Ser Leu Ser Pro Gly Lys
    210                 215

<210> SEQ ID NO 9
<211> LENGTH: 217
<212> TYPE: PRT
<213> ORGANISM: Artificial Sequence
<220> FEATURE:
<223> OTHER INFORMATION: unmodified IgG1 CH1-CH2 region

<400> SEQUENCE: 9

Ala Pro Glu Leu Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser His Glu Asp Pro Glu Val Gln Phe Lys Trp Tyr
        35                  40                  45

Val Asp Gly Val Glu Val His Asn Ala Lys Thr Lys Pro Arg Glu Glu
    50                  55                  60

Gln Tyr Asn Ser Thr Phe Arg Val Val Ser Val Leu Thr Val Leu His
65                  70                  75                  80

Gln Asp Trp Leu Asn Gly Lys Glu Tyr Lys Cys Lys Val Ser Asn Lys
                85                  90                  95

Ala Leu Pro Ala Pro Ile Glu Lys Thr Ile Ser Lys Thr Lys Gly Gln
            100                 105                 110

Pro Arg Glu Pro Gln Val Tyr Thr Leu Pro Pro Ser Arg Glu Glu Met
        115                 120                 125

Thr Lys Asn Gln Val Ser Leu Thr Cys Leu Val Lys Gly Phe Tyr Pro
    130                 135                 140

Ser Asp Ile Ala Val Glu Trp Glu Ser Ser Gly Gln Pro Glu Asn Asn
145                 150                 155                 160

Tyr Asn Thr Thr Pro Pro Met Leu Asp Ser Asp Gly Ser Phe Phe Leu
                165                 170                 175

Tyr Ser Lys Leu Thr Val Asp Lys Ser Arg Trp Gln Gln Gly Asn Ile
            180                 185                 190

Phe Ser Cys Ser Val Met His Glu Ala Leu His Asn Arg Phe Thr Gln
        195                 200                 205

Lys Ser Leu Ser Leu Ser Pro Gly Lys
    210                 215

<210> SEQ ID NO 10
<211> LENGTH: 217
<212> TYPE: PRT
<213> ORGANISM: Artificial Sequence
<220> FEATURE:
<223> OTHER INFORMATION: unmodified IgG1 CH1-CH2 region

<400> SEQUENCE: 10

Ala Pro Glu Phe Leu Gly Gly Pro Ser Val Phe Leu Phe Pro Pro Lys
1               5                   10                  15

Pro Lys Asp Thr Leu Met Ile Ser Arg Thr Pro Glu Val Thr Cys Val
            20                  25                  30

Val Val Asp Val Ser Gln Glu Asp Pro Glu Val Gln Phe Asn Trp Tyr
        35                  40                  45
```

```
Val Asp Gly Val Glu Val His Asn Ala Lys Thr Lys Pro Arg Glu Glu
 50                  55                  60

Gln Phe Asn Ser Thr Tyr Arg Val Val Ser Val Leu Thr Val Leu His
 65                  70                  75                  80

Gln Asp Trp Leu Asn Gly Lys Glu Tyr Lys Cys Lys Val Ser Asn Lys
                 85                  90                  95

Gly Leu Pro Ser Ser Ile Glu Lys Thr Ile Ser Lys Ala Lys Gly Gln
            100                 105                 110

Pro Arg Glu Pro Gln Val Tyr Thr Leu Pro Pro Ser Gln Glu Glu Met
        115                 120                 125

Thr Lys Asn Gln Val Ser Leu Thr Cys Leu Val Lys Gly Phe Tyr Pro
130                 135                 140

Ser Asp Ile Ala Val Glu Trp Glu Ser Asn Gly Gln Pro Glu Asn Asn
145                 150                 155                 160

Tyr Lys Thr Thr Pro Pro Val Leu Asp Ser Asp Gly Ser Phe Phe Leu
                165                 170                 175

Tyr Ser Arg Leu Thr Val Asp Lys Ser Arg Trp Gln Glu Gly Asn Val
            180                 185                 190

Phe Ser Cys Ser Val Met His Glu Ala Leu His Asn His Tyr Thr Gln
        195                 200                 205

Lys Ser Leu Ser Leu Ser Leu Gly Lys
210                 215

<210> SEQ ID NO 11
<211> LENGTH: 15
<212> TYPE: PRT
<213> ORGANISM: Artificial Sequence
<220> FEATURE:
<223> OTHER INFORMATION: unmodified IgG1 hinge region

<400> SEQUENCE: 11

Glu Pro Lys Ser Cys Asp Lys Thr His Thr Cys Pro Pro Cys Pro
1               5                   10                  15

<210> SEQ ID NO 12
<211> LENGTH: 12
<212> TYPE: PRT
<213> ORGANISM: Artificial Sequence
<220> FEATURE:
<223> OTHER INFORMATION: unmodified IgG2 hinge region

<400> SEQUENCE: 12

Glu Arg Lys Cys Cys Val Glu Cys Pro Pro Cys Pro
1               5                   10

<210> SEQ ID NO 13
<211> LENGTH: 62
<212> TYPE: PRT
<213> ORGANISM: Artificial Sequence
<220> FEATURE:
<223> OTHER INFORMATION: unmodified IgG3 hinge region

<400> SEQUENCE: 13

Glu Leu Lys Thr Pro Leu Gly Asp Thr Thr His Thr Cys Pro Arg Cys
1               5                   10                  15

Pro Glu Pro Lys Ser Cys Asp Thr Pro Pro Cys Pro Arg Cys Pro
            20                  25                  30

Glu Pro Lys Ser Cys Asp Thr Pro Pro Cys Pro Arg Cys Pro Glu
        35                  40                  45

Pro Lys Ser Cys Asp Thr Pro Pro Cys Pro Arg Cys Pro
```

<210> SEQ ID NO 14
<211> LENGTH: 12
<212> TYPE: PRT
<213> ORGANISM: Artificial Sequence
<220> FEATURE:
<223> OTHER INFORMATION: unmodified IgG4 hinge region

<400> SEQUENCE: 14

Glu Ser Lys Tyr Gly Pro Pro Cys Pro Ser Cys Pro
1               5                   10

<210> SEQ ID NO 15
<211> LENGTH: 229
<212> TYPE: PRT
<213> ORGANISM: Artificial Sequence
<220> FEATURE:
<223> OTHER INFORMATION: IgG4 Fc region

<400> SEQUENCE: 15

Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 16
<211> LENGTH: 229
<212> TYPE: PRT
<213> ORGANISM: Artificial Sequence
<220> FEATURE:
<223> OTHER INFORMATION: modified IgG4 Fc region - L235E mutation

<400> SEQUENCE: 16

Glu Ser Lys Tyr Gly Pro Pro Cys Pro Ser Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
            35                  40                  45

Ser Gln Glu Asp Pro Glu Val Gln Phe Asn Trp Tyr Val Asp Gly Val
50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
            115                 120                 125

Gln Val Tyr Thr Leu Pro Pro Ser Gln Glu Glu Met Thr Lys Asn Gln
130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
            195                 200                 205

Val Met His Glu Ala Leu His Asn His Tyr Thr Gln Lys Ser Leu Ser
            210                 215                 220

Leu Ser Leu Gly Lys
225

<210> SEQ ID NO 17
<211> LENGTH: 229
<212> TYPE: PRT
<213> ORGANISM: Artificial Sequence
<220> FEATURE:
<223> OTHER INFORMATION: modified IgG4 Fc region - N297Q mutation

<400> SEQUENCE: 17

Glu Ser Lys Tyr Gly Pro Pro Cys Pro Ser Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
            35                  40                  45

Ser Gln Glu Asp Pro Glu Val Gln Phe Asn Trp Tyr Val Asp Gly Val
50                  55                  60

Glu Val His Asn Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
            115                 120                 125

```
Gln Val Tyr Thr Leu Pro Pro Ser Gln Glu Glu Met Thr Lys Asn Gln
            130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 18
<211> LENGTH: 229
<212> TYPE: PRT
<213> ORGANISM: Artificial Sequence
<220> FEATURE:
<223> OTHER INFORMATION: modified IgG4 Fc region - EQ mutation

<400> SEQUENCE: 18

Glu Ser Lys Tyr Gly Pro Pro Cys Pro Ser Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 19
```

<211> LENGTH: 229
<212> TYPE: PRT
<213> ORGANISM: Artificial Sequence
<220> FEATURE:
<223> OTHER INFORMATION: modified IgG4 Fc region - S228P+L235E+N297Q
    mutation

<400> SEQUENCE: 19

Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 20
<211> LENGTH: 129
<212> TYPE: PRT
<213> ORGANISM: Artificial Sequence
<220> FEATURE:
<223> OTHER INFORMATION: IgG4 spacer domain - ch2delta mutation/deletion

<400> SEQUENCE: 20

Glu Ser Lys Tyr Gly Pro Pro Cys Pro Pro Cys Pro Gly Gly Gly Ser
1               5                   10                  15

Ser Gly Gly Gly Ser Gly Gly Gln Pro Arg Glu Pro Gln Val Tyr Thr
            20                  25                  30

Leu Pro Pro Ser Gln Glu Glu Met Thr Lys Asn Gln Val Ser Leu Thr
        35                  40                  45

Cys Leu Val Lys Gly Phe Tyr Pro Ser Asp Ile Ala Val Glu Trp Glu
    50                  55                  60

Ser Asn Gly Gln Pro Glu Asn Asn Tyr Lys Thr Thr Pro Pro Val Leu
65                  70                  75                  80

```
Asp Ser Asp Gly Ser Phe Phe Leu Tyr Ser Arg Leu Thr Val Asp Lys
                85                  90                  95

Ser Arg Trp Gln Glu Gly Asn Val Phe Ser Cys Ser Val Met His Glu
        100                 105                 110

Ala Leu His Asn His Tyr Thr Gln Lys Ser Leu Ser Leu Ser Leu Gly
    115                 120                 125

Lys
```

<210> SEQ ID NO 21
<211> LENGTH: 112
<212> TYPE: PRT
<213> ORGANISM: Artificial Sequence
<220> FEATURE:
<223> OTHER INFORMATION: T cell receptor zeta-chain signaling domain

<400> SEQUENCE: 21

```
Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110
```

<210> SEQ ID NO 22
<211> LENGTH: 41
<212> TYPE: PRT
<213> ORGANISM: Artificial Sequence
<220> FEATURE:
<223> OTHER INFORMATION: modified costimulatory signaling domain region

<400> SEQUENCE: 22

```
Arg Ser Lys Arg Ser Arg Gly Gly His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

Pro Arg Asp Phe Ala Ala Tyr Arg Ser
        35                  40
```

<210> SEQ ID NO 23
<211> LENGTH: 28
<212> TYPE: PRT
<213> ORGANISM: Artificial Sequence
<220> FEATURE:
<223> OTHER INFORMATION: modified costimulatory signaling domain region

<400> SEQUENCE: 23

```
Met Phe Trp Val Leu Val Val Val Gly Gly Val Leu Ala Cys Tyr Ser
1               5                   10                  15

Leu Leu Val Thr Val Ala Phe Ile Ile Phe Trp Val
            20                  25
```

<210> SEQ ID NO 24

<211> LENGTH: 680
<212> TYPE: PRT
<213> ORGANISM: Artificial Sequence
<220> FEATURE:
<223> OTHER INFORMATION: anti-CD19 CAR (CD19R(L235E)28Z)

<400> SEQUENCE: 24

```
Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
    130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
                245                 250                 255

Trp Gly Gln Gly Thr Ser Val Thr Val Ser Ser Glu Ser Lys Tyr Gly
            260                 265                 270

Pro Pro Cys Pro Pro Cys Pro Ala Pro Glu Phe Glu Gly Gly Pro Ser
        275                 280                 285

Val Phe Leu Phe Pro Pro Lys Pro Lys Asp Thr Leu Met Ile Ser Arg
    290                 295                 300

Thr Pro Glu Val Thr Cys Val Val Val Asp Val Ser Gln Glu Asp Pro
305                 310                 315                 320

Glu Val Gln Phe Asn Trp Tyr Val Asp Gly Val Glu Val His Asn Ala
                325                 330                 335

Lys Thr Lys Pro Arg Glu Glu Gln Phe Asn Ser Thr Tyr Arg Val Val
            340                 345                 350

Ser Val Leu Thr Val Leu His Gln Asp Trp Leu Asn Gly Lys Glu Tyr
        355                 360                 365

Lys Cys Lys Val Ser Asn Lys Gly Leu Pro Ser Ser Ile Glu Lys Thr
    370                 375                 380
```

```
Ile Ser Lys Ala Lys Gly Gln Pro Arg Glu Pro Gln Val Tyr Thr Leu
385                 390                 395                 400

Pro Pro Ser Gln Glu Glu Met Thr Lys Asn Gln Val Ser Leu Thr Cys
            405                 410                 415

Leu Val Lys Gly Phe Tyr Pro Ser Asp Ile Ala Val Trp Glu Ser
        420                 425                 430

Asn Gly Gln Pro Glu Asn Asn Tyr Lys Thr Thr Pro Pro Val Leu Asp
            435                 440                 445

Ser Asp Gly Ser Phe Phe Leu Tyr Ser Arg Leu Thr Val Asp Lys Ser
        450                 455                 460

Arg Trp Gln Glu Gly Asn Val Phe Ser Cys Ser Val Met His Glu Ala
465                 470                 475                 480

Leu His Asn His Tyr Thr Gln Lys Ser Leu Ser Leu Ser Leu Gly Lys
                485                 490                 495

Met Phe Trp Val Leu Val Val Gly Gly Val Leu Ala Cys Tyr Ser
            500                 505                 510

Leu Leu Val Thr Val Ala Phe Ile Ile Phe Trp Val Arg Ser Lys Arg
        515                 520                 525

Ser Arg Gly Gly His Ser Asp Tyr Met Asn Met Thr Pro Arg Arg Pro
530                 535                 540

Gly Pro Thr Arg Lys His Tyr Gln Pro Tyr Ala Pro Pro Arg Asp Phe
545                 550                 555                 560

Ala Ala Tyr Arg Ser Gly Gly Arg Val Lys Phe Ser Arg Ser Ala
            565                 570                 575

Asp Ala Pro Ala Tyr Gln Gln Gly Gln Asn Gln Leu Tyr Asn Glu Leu
            580                 585                 590

Asn Leu Gly Arg Arg Glu Glu Tyr Asp Val Leu Asp Lys Arg Arg Gly
        595                 600                 605

Arg Asp Pro Glu Met Gly Gly Lys Pro Arg Arg Lys Asn Pro Gln Glu
610                 615                 620

Gly Leu Tyr Asn Glu Leu Gln Lys Asp Lys Met Ala Glu Ala Tyr Ser
625                 630                 635                 640

Glu Ile Gly Met Lys Gly Glu Arg Arg Arg Gly Lys Gly His Asp Gly
                645                 650                 655

Leu Tyr Gln Gly Leu Ser Thr Ala Thr Lys Asp Thr Tyr Asp Ala Leu
        660                 665                 670

His Met Gln Ala Leu Pro Pro Arg
            675                 680

<210> SEQ ID NO 25
<211> LENGTH: 680
<212> TYPE: PRT
<213> ORGANISM: Artificial Sequence
<220> FEATURE:
<223> OTHER INFORMATION: nti-CD19 CAR (CD19R(N297Q)28Z)

<400> SEQUENCE: 25

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
        35                  40                  45

Gln Asp Ile Ser Lys Tyr Leu Asn Trp Tyr Gln Gln Lys Pro Asp Gly
    50                  55                  60
```

-continued

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
            85                  90                  95

Ile Ser Asn Leu Glu Gln Glu Asp Ile Ala Thr Tyr Phe Cys Gln Gln
                100                 105                 110

Gly Asn Thr Leu Pro Tyr Thr Phe Gly Gly Gly Thr Lys Leu Glu Ile
            115                 120                 125

Thr Gly Ser Thr Ser Gly Ser Gly Lys Pro Gly Ser Gly Glu Gly Ser
130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
            195                 200                 205

Ala Leu Lys Ser Arg Leu Thr Ile Ile Lys Asp Asn Ser Lys Ser Gln
210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Gly Gly Ser Tyr Ala Met Asp Tyr
                245                 250                 255

Trp Gly Gln Gly Thr Ser Val Thr Val Ser Ser Glu Ser Lys Tyr Gly
            260                 265                 270

Pro Pro Cys Pro Pro Cys Pro Ala Pro Glu Phe Leu Gly Gly Pro Ser
            275                 280                 285

Val Phe Leu Phe Pro Pro Lys Pro Lys Asp Thr Leu Met Ile Ser Arg
290                 295                 300

Thr Pro Glu Val Thr Cys Val Val Asp Val Ser Gln Glu Asp Pro
305                 310                 315                 320

Glu Val Gln Phe Asn Trp Tyr Val Asp Gly Val Glu Val His Asn Ala
                325                 330                 335

Lys Thr Lys Pro Arg Glu Glu Gln Phe Gln Ser Thr Tyr Arg Val Val
            340                 345                 350

Ser Val Leu Thr Val Leu His Gln Asp Trp Leu Asn Gly Lys Glu Tyr
            355                 360                 365

Lys Cys Lys Val Ser Asn Lys Gly Leu Pro Ser Ser Ile Glu Lys Thr
            370                 375                 380

Ile Ser Lys Ala Lys Gly Gln Pro Arg Glu Pro Gln Val Tyr Thr Leu
385                 390                 395                 400

Pro Pro Ser Gln Glu Glu Met Thr Lys Asn Gln Val Ser Leu Thr Cys
                405                 410                 415

Leu Val Lys Gly Phe Tyr Pro Ser Asp Ile Ala Val Glu Trp Glu Ser
            420                 425                 430

Asn Gly Gln Pro Glu Asn Asn Tyr Lys Thr Thr Pro Pro Val Leu Asp
            435                 440                 445

Ser Asp Gly Ser Phe Phe Leu Tyr Ser Arg Leu Thr Val Asp Lys Ser
            450                 455                 460

Arg Trp Gln Glu Gly Asn Val Phe Ser Cys Ser Val Met His Glu Ala
465                 470                 475                 480

```
Leu His Asn His Tyr Thr Gln Lys Ser Leu Ser Leu Ser Leu Gly Lys
                485                 490                 495

Met Phe Trp Val Leu Val Val Val Gly Gly Val Leu Ala Cys Tyr Ser
            500                 505                 510

Leu Leu Val Thr Val Ala Phe Ile Ile Phe Trp Val Arg Ser Lys Arg
            515                 520                 525

Ser Arg Gly Gly His Ser Asp Tyr Met Asn Met Thr Pro Arg Arg Pro
530                 535                 540

Gly Pro Thr Arg Lys His Tyr Gln Pro Tyr Ala Pro Pro Arg Asp Phe
545                 550                 555                 560

Ala Ala Tyr Arg Ser Gly Gly Arg Val Lys Phe Ser Arg Ser Ala
                565                 570                 575

Asp Ala Pro Ala Tyr Gln Gln Gly Gln Asn Gln Leu Tyr Asn Glu Leu
                580                 585                 590

Asn Leu Gly Arg Arg Glu Glu Tyr Asp Val Leu Asp Lys Arg Arg Gly
                595                 600                 605

Arg Asp Pro Glu Met Gly Gly Lys Pro Arg Arg Lys Asn Pro Gln Glu
610                 615                 620

Gly Leu Tyr Asn Glu Leu Gln Lys Asp Lys Met Ala Glu Ala Tyr Ser
625                 630                 635                 640

Glu Ile Gly Met Lys Gly Glu Arg Arg Arg Gly Lys Gly His Asp Gly
                645                 650                 655

Leu Tyr Gln Gly Leu Ser Thr Ala Thr Lys Asp Thr Tyr Asp Ala Leu
                660                 665                 670

His Met Gln Ala Leu Pro Pro Arg
                675                 680

<210> SEQ ID NO 26
<211> LENGTH: 680
<212> TYPE: PRT
<213> ORGANISM: Artificial Sequence
<220> FEATURE:
<223> OTHER INFORMATION: anti-CD19 CAR (CD19R(EQ)28Z)

<400> SEQUENCE: 26

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
            20                  25                  30

Leu Ser Ala Ser Leu Gly Asp Arg Val Thr Ile Ser Cys Arg Ala Ser
            35                  40                  45

Gln Asp Ile Ser Lys Tyr Leu Asn Trp Tyr Gln Gln Lys Pro Asp Gly
50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
            115                 120                 125

Thr Gly Ser Thr Ser Gly Ser Gly Lys Pro Gly Ser Gly Glu Gly Ser
130                 135                 140

Thr Lys Gly Glu Val Lys Leu Gln Glu Ser Gly Pro Gly Leu Val Ala
145                 150                 155                 160
```

-continued

```
Pro Ser Gln Ser Leu Ser Val Thr Cys Thr Val Ser Gly Val Ser Leu
                165                 170                 175
Pro Asp Tyr Gly Val Ser Trp Ile Arg Gln Pro Pro Arg Lys Gly Leu
            180                 185                 190
Glu Trp Leu Gly Val Ile Trp Gly Ser Glu Thr Thr Tyr Tyr Asn Ser
        195                 200                 205
Ala Leu Lys Ser Arg Leu Thr Ile Ile Lys Asp Asn Ser Lys Ser Gln
    210                 215                 220
Val Phe Leu Lys Met Asn Ser Leu Gln Thr Asp Asp Thr Ala Ile Tyr
225                 230                 235                 240
Tyr Cys Ala Lys His Tyr Tyr Gly Gly Ser Tyr Ala Met Asp Tyr
                245                 250                 255
Trp Gly Gln Gly Thr Ser Val Thr Val Ser Ser Glu Ser Lys Tyr Gly
                260                 265                 270
Pro Pro Cys Pro Pro Cys Pro Ala Pro Glu Phe Glu Gly Gly Pro Ser
            275                 280                 285
Val Phe Leu Phe Pro Pro Lys Pro Lys Asp Thr Leu Met Ile Ser Arg
        290                 295                 300
Thr Pro Glu Val Thr Cys Val Val Asp Val Ser Gln Glu Asp Pro
305                 310                 315                 320
Glu Val Gln Phe Asn Trp Tyr Val Asp Gly Val Glu Val His Asn Ala
                325                 330                 335
Lys Thr Lys Pro Arg Glu Gln Phe Gln Ser Thr Tyr Arg Val Val
                340                 345                 350
Ser Val Leu Thr Val Leu His Gln Asp Trp Leu Asn Gly Lys Glu Tyr
            355                 360                 365
Lys Cys Lys Val Ser Asn Lys Gly Leu Pro Ser Ser Ile Glu Lys Thr
    370                 375                 380
Ile Ser Lys Ala Lys Gly Gln Pro Arg Glu Pro Gln Val Tyr Thr Leu
385                 390                 395                 400
Pro Pro Ser Gln Glu Glu Met Thr Lys Asn Gln Val Ser Leu Thr Cys
                405                 410                 415
Leu Val Lys Gly Phe Tyr Pro Ser Asp Ile Ala Val Glu Trp Glu Ser
                420                 425                 430
Asn Gly Gln Pro Glu Asn Asn Tyr Lys Thr Thr Pro Pro Val Leu Asp
            435                 440                 445
Ser Asp Gly Ser Phe Phe Leu Tyr Ser Arg Leu Thr Val Asp Lys Ser
    450                 455                 460
Arg Trp Gln Glu Gly Asn Val Phe Ser Cys Ser Val Met His Glu Ala
465                 470                 475                 480
Leu His Asn His Tyr Thr Gln Lys Ser Leu Ser Leu Ser Leu Gly Lys
                485                 490                 495
Met Phe Trp Val Leu Val Val Gly Gly Val Leu Ala Cys Tyr Ser
                500                 505                 510
Leu Leu Val Thr Val Ala Phe Ile Ile Phe Trp Val Arg Ser Lys Arg
            515                 520                 525
Ser Arg Gly Gly His Ser Asp Tyr Met Asn Met Thr Pro Arg Arg Pro
    530                 535                 540
Gly Pro Thr Arg Lys His Tyr Gln Pro Tyr Ala Pro Pro Arg Asp Phe
545                 550                 555                 560
Ala Ala Tyr Arg Ser Gly Gly Gly Arg Val Lys Phe Ser Arg Ser Ala
                565                 570                 575
Asp Ala Pro Ala Tyr Gln Gln Gly Gln Asn Gln Leu Tyr Asn Glu Leu
```

```
            580                 585                 590
Asn Leu Gly Arg Arg Glu Glu Tyr Asp Val Leu Asp Lys Arg Arg Gly
            595                 600                 605

Arg Asp Pro Glu Met Gly Gly Lys Pro Arg Arg Lys Asn Pro Gln Glu
            610                 615                 620

Gly Leu Tyr Asn Glu Leu Gln Lys Asp Lys Met Ala Glu Ala Tyr Ser
625                 630                 635                 640

Glu Ile Gly Met Lys Gly Glu Arg Arg Arg Gly Lys Gly His Asp Gly
            645                 650                 655

Leu Tyr Gln Gly Leu Ser Thr Ala Thr Lys Asp Thr Tyr Asp Ala Leu
            660                 665                 670

His Met Gln Ala Leu Pro Pro Arg
            675                 680

<210> SEQ ID NO 27
<211> LENGTH: 580
<212> TYPE: PRT
<213> ORGANISM: Artificial Sequence
<220> FEATURE:
<223> OTHER INFORMATION: anti-CD19 CAR (CD19RCH2?CD28Z)

<400> SEQUENCE: 27

Met Leu Leu Leu Val Thr Ser Leu Leu Leu Cys Glu Leu Pro His Pro
1               5                   10                  15

Ala Phe Leu Leu Ile Pro Asp Ile Gln Met Thr Gln Thr Thr Ser Ser
                20                  25                  30

Leu Ser Ala Ser Leu Gly Asp Arg Val Thr Ile Ser Cys Arg Ala Ser
            35                  40                  45

Gln Asp Ile Ser Lys Tyr Leu Asn Trp Tyr Gln Gln Lys Pro Asp Gly
        50                  55                  60

Thr Val Lys Leu Leu Ile Tyr His Thr Ser Arg Leu His Ser Gly Val
65                  70                  75                  80

Pro Ser Arg Phe Ser Gly Ser Gly Ser Gly Thr Asp Tyr Ser Leu Thr
                85                  90                  95

Ile Ser Asn Leu Glu Gln Glu Asp Ile Ala Thr Tyr Phe Cys Gln Gln
            100                 105                 110

Gly Asn Thr Leu Pro Tyr Thr Phe Gly Gly Gly Thr Lys Leu Glu Ile
        115                 120                 125

Thr Gly Ser Thr Ser Gly Ser Gly Lys Pro Gly Ser Gly Glu Gly Ser
130                 135                 140

Thr Lys Gly Glu Val Lys Leu Gln Glu Ser Gly Pro Gly Leu Val Ala
145                 150                 155                 160

Pro Ser Gln Ser Leu Ser Val Thr Cys Thr Val Ser Gly Val Ser Leu
                165                 170                 175

Pro Asp Tyr Gly Val Ser Trp Ile Arg Gln Pro Pro Arg Lys Gly Leu
            180                 185                 190

Glu Trp Leu Gly Val Ile Trp Gly Ser Glu Thr Thr Tyr Tyr Asn Ser
        195                 200                 205

Ala Leu Lys Ser Arg Leu Thr Ile Ile Lys Asp Asn Ser Lys Ser Gln
    210                 215                 220

Val Phe Leu Lys Met Asn Ser Leu Gln Thr Asp Asp Thr Ala Ile Tyr
225                 230                 235                 240

Tyr Cys Ala Lys His Tyr Tyr Tyr Gly Gly Ser Tyr Ala Met Asp Tyr
                245                 250                 255

Trp Gly Gln Gly Thr Ser Val Thr Val Ser Ser Glu Ser Lys Tyr Gly
```

-continued

```
                260               265               270
Pro Pro Cys Pro Pro Cys Pro Gly Gly Gly Ser Ser Gly Gly Gly Ser
            275               280               285

Gly Gly Gln Pro Arg Glu Pro Gln Val Tyr Thr Leu Pro Pro Ser Gln
        290               295               300

Glu Glu Met Thr Lys Asn Gln Val Ser Leu Thr Cys Leu Val Lys Gly
305               310               315               320

Phe Tyr Pro Ser Asp Ile Ala Val Glu Trp Glu Ser Asn Gly Gln Pro
                325               330               335

Glu Asn Asn Tyr Lys Thr Thr Pro Pro Val Leu Asp Ser Asp Gly Ser
            340               345               350

Phe Phe Leu Tyr Ser Arg Leu Thr Val Asp Lys Ser Arg Trp Gln Glu
        355               360               365

Gly Asn Val Phe Ser Cys Ser Val Met His Glu Ala Leu His Asn His
    370               375               380

Tyr Thr Gln Lys Ser Leu Ser Leu Ser Leu Gly Lys Met Phe Trp Val
385               390               395               400

Leu Val Val Val Gly Val Leu Ala Cys Tyr Ser Leu Leu Val Thr
                405               410               415

Val Ala Phe Ile Ile Phe Trp Val Arg Ser Lys Arg Ser Arg Gly Gly
            420               425               430

His Ser Asp Tyr Met Asn Met Thr Pro Arg Arg Pro Gly Pro Thr Arg
        435               440               445

Lys His Tyr Gln Pro Tyr Ala Pro Pro Arg Asp Phe Ala Ala Tyr Arg
    450               455               460

Ser Gly Gly Gly Arg Val Lys Phe Ser Arg Ser Ala Asp Ala Pro Ala
465               470               475               480

Tyr Gln Gln Gly Gln Asn Gln Leu Tyr Asn Glu Leu Asn Leu Gly Arg
                485               490               495

Arg Glu Glu Tyr Asp Val Leu Asp Lys Arg Arg Gly Arg Asp Pro Glu
            500               505               510

Met Gly Gly Lys Pro Arg Arg Lys Asn Pro Gln Glu Gly Leu Tyr Asn
        515               520               525

Glu Leu Gln Lys Asp Lys Met Ala Glu Ala Tyr Ser Glu Ile Gly Met
    530               535               540

Lys Gly Glu Arg Arg Arg Gly Lys Gly His Asp Gly Leu Tyr Gln Gly
545               550               555               560

Leu Ser Thr Ala Thr Lys Asp Thr Tyr Asp Ala Leu His Met Gln Ala
                565               570               575

Leu Pro Pro Arg
            580
```